(12) United States Patent
Yamamoto et al.

(10) Patent No.: US 11,243,065 B2
(45) Date of Patent: Feb. 8, 2022

(54) ROTATION ANGLE DETECTION DEVICE, ROTATION ANGLE DETECTION METHOD AND PROGRAM

(71) Applicant: Asahi Kasei Microdevices Corporation, Tokyo (JP)

(72) Inventors: Takeo Yamamoto, Tokyo (JP); Satoshi Fukase, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 195 days.

(21) Appl. No.: 16/599,119

(22) Filed: Oct. 11, 2019

(65) Prior Publication Data

US 2020/0116470 A1 Apr. 16, 2020

(30) Foreign Application Priority Data

Oct. 15, 2018 (JP) .............................. JP2018-194096

(51) Int. Cl.
*G01B 7/30* (2006.01)
*G01D 5/14* (2006.01)
*G01D 18/00* (2006.01)
*G01D 3/02* (2006.01)

(52) U.S. Cl.
CPC ............... *G01B 7/30* (2013.01); *G01D 3/022* (2013.01); *G01D 5/14* (2013.01); *G01D 18/00* (2013.01); *G01D 5/145* (2013.01)

(58) Field of Classification Search
CPC . G01B 7/30; G01D 3/022; G01D 5/14; G01D 5/145; G01D 18/00
See application file for complete search history.

(56) References Cited

U.S. PATENT DOCUMENTS

| 5,850,142 | A | * | 12/1998 | Rountos | ................ | G01D 5/145 |
| | | | | | | 324/207.2 |
| 9,515,589 | B2 | * | 12/2016 | Kozaki | ............... | F04D 15/0066 |
| 10,254,135 | B2 | | 4/2019 | Mochizuki | | |
| 2016/0363638 | A1 | * | 12/2016 | Daubert | ............... | G01R 33/093 |
| 2018/0273045 | A1 | * | 9/2018 | Herrera | ................ | B60W 40/11 |
| 2020/0220434 | A1 | * | 7/2020 | Kimura | ................ | G01D 5/145 |

* cited by examiner

*Primary Examiner* — Walter L Lindsay, Jr.
*Assistant Examiner* — Geoffrey T Evans

(57) ABSTRACT

Provided is a rotation angle detection device configured to detect a rotation angle of a magnetic field generation source, based on a magnetic field in at least two directions detected by a magnetic field detection device. The rotation angle detection device includes a correction value calculation unit configured to calculate a correction value of the rotation angle; an angle output unit configured to output an angle output signal indicative of the rotation angle of the magnetic field generation source, based on a magnetic field detection signal to be output from the magnetic field detection device and the correction value; and a filter unit capable of selecting a first filter characteristic, which is to be used for outputting the angle output signal, and a second filter characteristic, which is to be used for calculating the correction value and is different from the first filter characteristic.

9 Claims, 17 Drawing Sheets

ROTATION ANGLE DETECTION DEVICE, ROTATION ANGLE DETECTION METHOD AND PROGRAM

This application is based upon and claims the benefit of priority from prior Japanese patent application No. 2018-194096, filed on Oct. 15, 2018, the entire contents of which are incorporated herein by reference.

BACKGROUND

1. Technical Field

The present invention relates to a rotation angle detection device, a rotation angle detection method and a program.

2. Related Art

In the related art, known is a device having a magnetic field generation unit provided on a rotating body, and configured to detect a rotation angle of the rotating body, based on magnetic field components measured around the rotating body (for example, Patent Document 1).

Patent Document 1: Japanese Patent No. 6,191,840B

SUMMARY

In the rotation angle detection device, the rotation angle is corrected, based on error information about the rotation angle acquired in advance. For this reason, it is preferably to acquire the error information about the rotation angle with accuracy.

In order to solve the above problem, a first aspect of the present invention provides a rotation angle detection device configured to detect a rotation angle of a magnetic field generation source, based on a magnetic field in at least two directions detected by a magnetic field detection device. The rotation angle detection device may include a correction value calculation unit configured to calculate a correction value of the rotation angle. The rotation angle detection device may include an angle output unit configured to output an angle output signal indicative of the rotation angle of the magnetic field generation source, based on a magnetic field detection signal to be output from the magnetic field detection device and the correction value. The rotation angle detection device may include a filter unit capable of selecting a first filter characteristic, which is to be used for outputting the angle output signal, and a second filter characteristic, which is to be used for calculating the correction value and is different from the first filter characteristic.

A band of the first filter characteristic through which a signal is to pass may be narrower than a band of the second filter characteristic through which a signal is to pass.

The angle output unit may include a first computing unit configured to output a first computing signal corresponding to the magnetic field detection signal. The angle output unit may include an angle update unit configured to output the angle output signal, based on the first computing signal. The angle output unit may include a feedback unit configured to generate a magnetic field correction signal and to output the same to the first computing unit. The filter unit may be configured to input a signal, which is to be obtained by filtering an output from the first computing unit, to the angle update unit. When the rotation angle detection device calculates the correction value, the first computing unit may be input with the magnetic field detection signal and may output the first computing signal. The angle update unit may be input with a signal filtered using the second filter characteristic and may generate an uncorrected angle signal. The correction value calculation unit may calculate the correction value, based on the uncorrected angle signal. When the rotation angle detection device generates the angle output signal, the first computing unit may be input with the magnetic field detection signal and the magnetic field correction signal and may output the first computing signal. The angle update unit may be input with a signal filtered using the first filter characteristic and may generate the angle output signal. The feedback unit may calculate the magnetic field correction signal by inputting the angle output signal and the correction value, and feed the same back to the first computing unit.

The angle output unit may include an angle computing unit configured to output an angle signal, which corresponds to a magnetic field detection signal corresponding to a magnetic field detected by the magnetic field detection device and the correction value. The correction value calculation unit may be configured to calculate a correction value, based on the angle signal output by the angle computing unit without using the correction value. When calculating a correction value of the rotation angle, the filter unit may input a signal, which is obtained by filtering the angle signal by using the second filter characteristic, to the correction value calculation unit. When generating the angle output signal by using the correction value, the filter unit may output a signal, which is obtained by filtering the angle signal by using the first filter characteristic, as the angle output signal.

The angle output unit may include an angle computing unit configured to output an angle output signal, based on a magnetic field detection signal corresponding to a magnetic field detected by the magnetic field detection device. The correction value calculation unit may be configured to calculate a correction value, based on the angle output signal output by the angle computing unit without using the correction value. When calculating the correction value, the filter unit may input a signal, which is obtained by filtering the magnetic field detection signal by using the second filter characteristic, to the angle computing unit. When generating the angle output signal by using the correction value, the filter unit may input a signal, which is obtained by filtering the magnetic field detection signal by using the first filter characteristic, to the angle computing unit.

The correction value calculation unit may be configured to calculate a correction value, based on the angle output signal generated by the angle update unit without using the correction value, and a reference angle signal having passed through a filter having a preset delay characteristic.

A second aspect of the present invention provides a rotation angle detection method of detecting a rotation angle of a magnetic field generation source, based on a magnetic field in at least two directions detected by a magnetic field detection device. The method may include correction value calculating of calculating a correction value of a rotation angle, based on a signal having passed through a filter unit for which a second filter characteristic is selected in the filter unit in which a first filter characteristic and the second filter characteristic different from the first filter characteristic can be selected. The method may include angle outputting of outputting an angle output signal indicative of a rotation angle of the magnetic field generation source, based on a signal having passed through the filter unit for which the first filter characteristic is selected and the correction value.

A third aspect of the present invention provides a program for causing a computer to execute the rotation angle detection method in accordance with the second aspect.

A third aspect of the present invention provides a program for causing a computer to execute the rotation angle detection method in accordance with the second aspect.

In the meantime, the summary of the present invention does not necessarily describe all necessary features of the present invention. The present invention may also be a sub-combination of the features described above.

DESCRIPTION OF EXEMPLARY EMBODIMENTS

Herein below, an embodiment of the present invention will be described. The embodiment does not limit the invention defined in the claims. Also, all combinations of features described in the embodiment are not necessarily essential to solving means of the invention.

Figure 1:
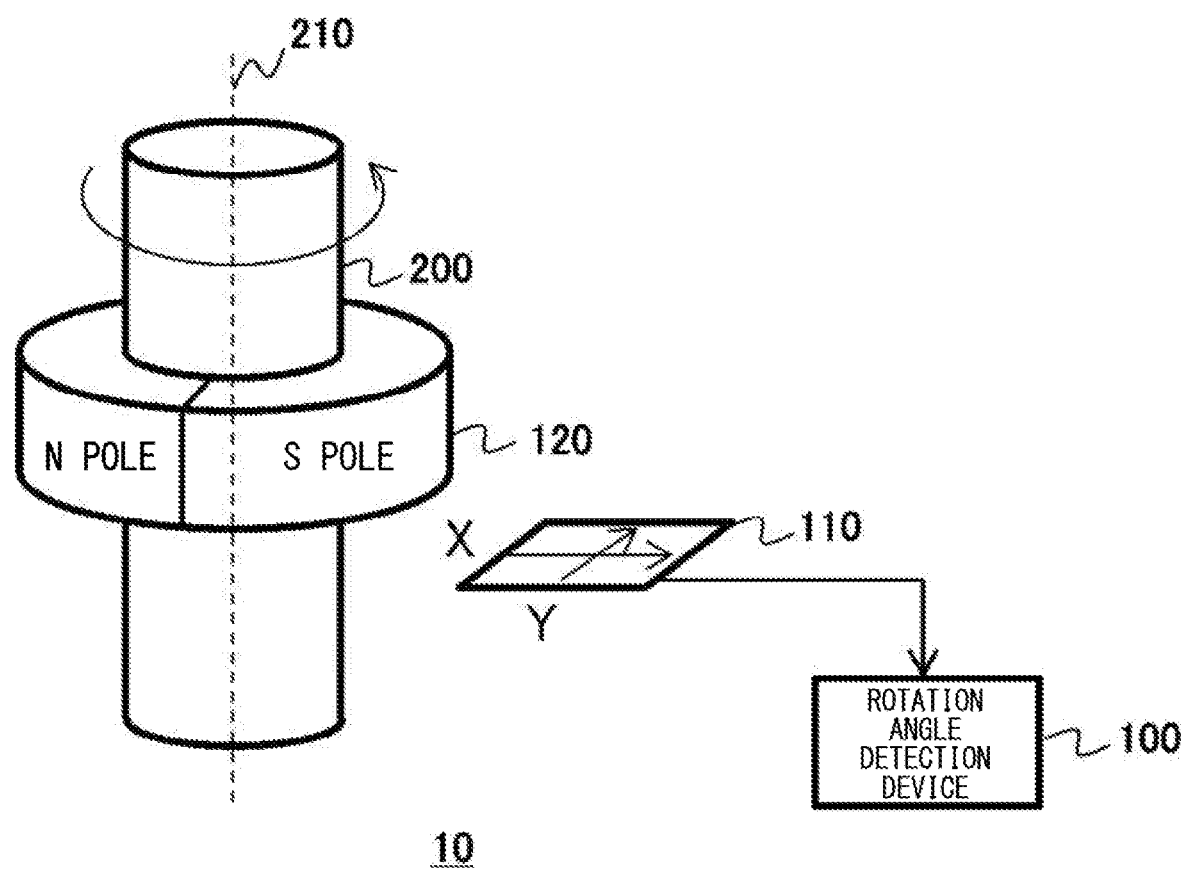
FIG. 1 shows an example of a system 10 configured to detect a rotation angle of a rotating body 200.

FIG. 1 shows an example of a system 10 configured to detect a rotation angle of a rotating body 200. The rotating body 200 is configured to rotate about a predetermined axis of rotation 210. In FIG. 1, the rotating body 200 has a rod shape. However, the shape of the rotating body 200 is not limited to the example of FIG. 1.

The system 10 includes a magnetic field generation source 120, a magnetic field detection device 110 and a rotation angle detection device 100. The magnetic field generation source 120 is fixed to the rotating body 200. The magnetic field generation source 120 is configured to rotate in association with rotation of the rotating body 200. In the present example, the magnetic field generation source 120 is configured to rotate about the axis of rotation 210. The magnetic field generation source 120 may be a magnet having an S pole and an N pole. The S pole and the N pole may be aligned along a plane perpendicular to the axis of rotation 210.

The magnetic field detection device 110 is configured to detect a magnetic field that is to be generated by the magnetic field generation source 120. The magnetic field detection device 110 is configured to detect magnetic field components in at least two directions, in a position of the magnetic field detection device 110. In the present example, the magnetic field detection device 110 is configured to detect the magnetic field components in two directions of an X axis direction and a Y axis direction perpendicular to each other on a plane perpendicular to the axis of rotation 210. In the example of FIG. 1, the magnetic field detection device 110 is arranged in a position distant from the axis of rotation 210. However, in another example, the magnetic field detection device 110 may be arranged in a position through which the axis of rotation 210 passes. The magnetic field detection device 110 is provided in a position in which the magnetic field components in the two directions are to change in correspondence to a rotation angle of the magnetic field generation source 120.

The magnetic field detection device 110 may be configured to convert each of the detected magnetic field components into an electric signal. The magnetic field detection device 110 includes, for example, a Hall element or a magnetic resistance element. However, the means for detecting the magnetic field component is not limited thereto.

The rotation angle detection device 100 is configured to detect a rotation angle of the magnetic field generation source 120, based on the magnetic field components detected by the magnetic field detection device 110. The rotation angle detection device 100 includes signal processing units configured to process the electric signals. The rotation angle detection device 100 may be a general-purpose device such as a computer, or may be a dedicated device for detecting the rotation angle. Some or all configurations of the rotation angle detection device 100 may be provided integrally with the magnetic field detection device 110 or may be provided separately from the magnetic field detection device 110. Some or all configurations of the rotation angle detection device 100 may be formed on a semiconductor substrate common to the magnetic field detection device 110.

The magnetic field components $Vx(\theta)$ and $Vy(\theta)$ in the X axis direction and the Y axis direction, which are detected by the magnetic field detection device 110, may be expressed by an equation (1). In the specification, signals indicative of the magnetic field components Vx and Vy, and angles φ, φo and θ may be described using the corresponding symbols.

[Math 1]

$$Vx(\theta)=(1+\alpha)\cos(\theta+\beta)+Ox \quad (1)$$

$$Vy(\theta)=(1-\alpha)\sin(\theta-\beta)+Oy \quad (2)$$

θ is a reference angle of the magnetic field generation source 120. The reference angle corresponds to an actual rotation angle of the magnetic field generation source 120.

When the reference angle is denoted as θ(i), it indicates an $i^{th}$ angle in a case in which an angle of 360° that the magnetic field generation source 120 makes one revolution is divided into N equal parts. N is an integer of 2 or greater, and i is an integer from 0 to N−1. Ox and Oy indicate offset errors of the magnetic field components detected by the magnetic field detection device 110. α indicates an amplitude error of the magnetic field component detected by the magnetic field detection device 110, and is −1<α<1. β indicates a phase error of the magnetic field component detected by the magnetic field detection device 110, and is −π<β<+π. Each error may include not only an error of the magnetic field component detected by the magnetic field detection device 110 but also an error generated in the magnetic field detection device 110.

In the rotation angle detection device 100, arc tangents of the magnetic field components Vx(θ) and Vy(θ) expressed by the equations (1) and (2) are calculated, so that the rotation angle of the magnetic field generation source 120 before correction can be detected. In the specification, the rotation angle before correction is referred to as 'uncorrected detected angle φ'. An angle error of the uncorrected detected angle φ with respect to the reference angle θ can be expressed by an equation (2). The angle error has a periodic error with respect to one revolution of the rotation angle, as shown in an equation (3), and each amplitude value has correlation with each error component in the equations (1) and (2).

[Math 2]

$$\varphi-\theta=-Ox\sin1\theta+Oy\cos1\theta-\alpha\sin2\theta-\beta\cos2\theta \quad (3)$$

The rotation angle detection device 100 is configured to calculate a correction value for correcting each of the error components Ox, Oy, α and β, and to detect the rotation angle by using the correction values. In the specification, the rotation angle after correction is referred to as 'corrected detected angle φo'. In the present example, when acquiring the correction values and when calculating the rotation angle by using the correction values, the rotation angle detection device 100 applies filters having different filter characteristics, thereby calculating the correction values with accuracy.

Figure 2:
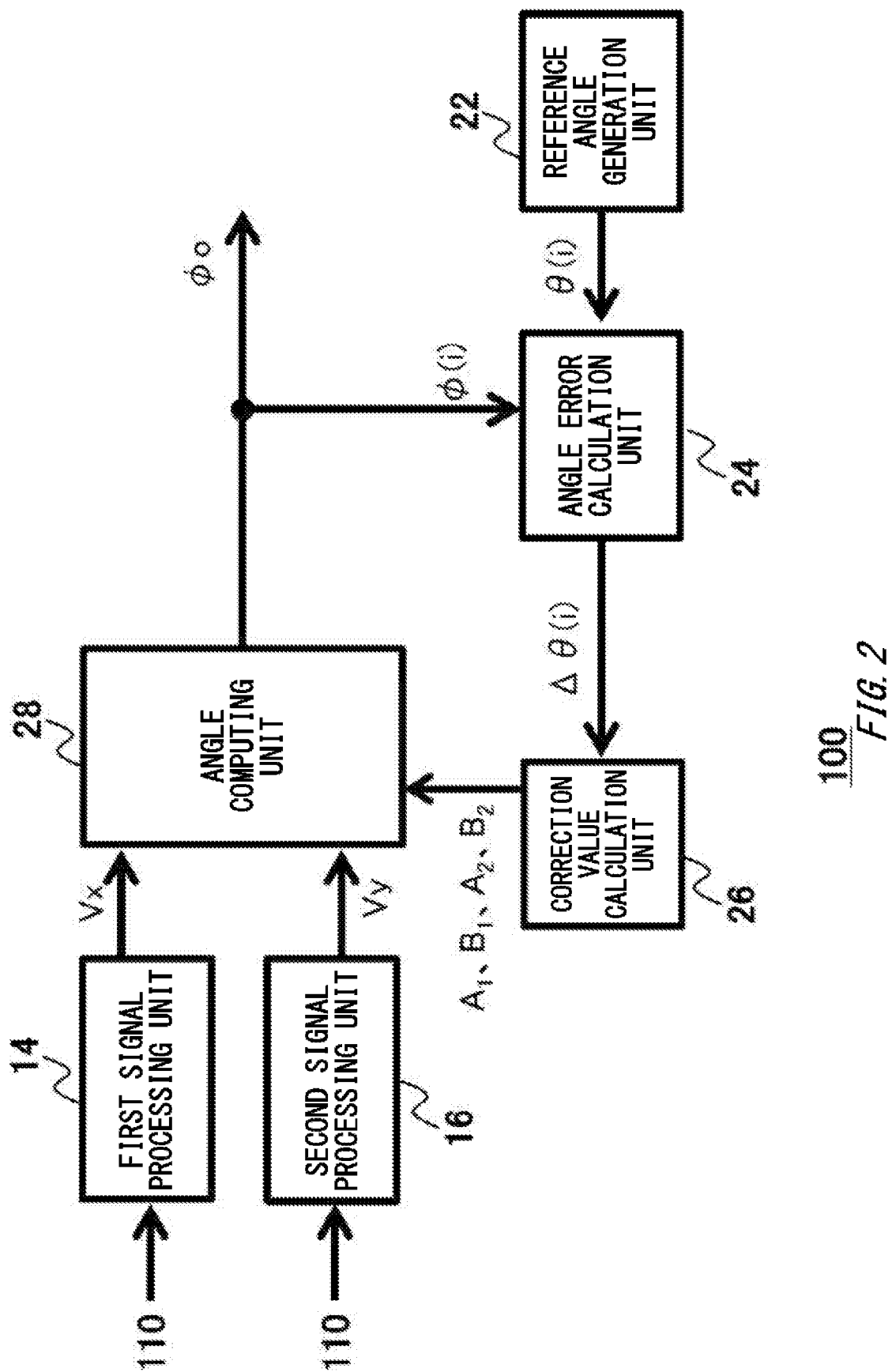
FIG. 2 is a block diagram showing a configuration example of a rotation angle detection device 100.

FIG. 2 is a block diagram showing a configuration example of the rotation angle detection device 100. The rotation angle detection device 100 is configured to detect the rotation angle of the magnetic field generation source 120, based on the magnetic field components detected by the magnetic field detection device 110. In the present example, the rotation angle detection device 100 includes a first signal processing unit 14, a second signal processing unit 16, an angle computing unit 28, a reference angle generation unit 22, an angle error calculation unit 24 and a correction value calculation unit 26.

The first signal processing unit 14 and the second signal processing unit 16 are configured to acquire magnetic field detection signals of the magnetic field detection device 110 in at least two angle states (i) in which the rotation angles of the magnetic field generation source 120 are different. For example, the magnetic field detection signal is an electric signal indicative of the magnetic field component shown in the equations (1) and (2). In the present example, the first signal processing unit 14 is configured to acquire an electric signal indicative of the magnetic field component Vx. The second signal processing unit 16 is configured to acquire an electric signal indicative of the magnetic field component Vy. The first signal processing unit 14 and the second signal processing unit 16 are configured to acquire the magnetic field components in at least two angle states. In the present example, the first signal processing unit 14 and the second signal processing unit 16 are configured to acquire the magnetic field components in N angle states. The first signal processing unit 14 and the second signal processing unit 16 may be configured to sample the electric signals indicative of the magnetic field components at predetermined timing, thereby acquiring the magnetic field components in each angle state.

Also, the first signal processing unit 14 and the second signal processing unit 16 may output the magnetic field components Vx and Vy after performing predetermined processing for the same. For example, the first signal processing unit 14 and the second signal processing unit 16 may be configured to amplify signal levels of the input magnetic field components Vx and Vy or to perform predetermined filter processing for the same.

The reference angle generation unit 22 is configured to generate the reference angle θ. For example, the rotating body 200 or the like may be provided with an angle detection means such as a rotary encoder or the like, and the reference angle generation unit 22 may be configured to output the rotation angle detected by the angle detection means, as the reference angle θ(i). Also, the first signal processing unit 14 and the second signal processing unit 16 are configured to acquire the electric signals indicative of the magnetic field components, in synchronization with the reference angle generation unit 22. That is, the first signal processing unit 14 and the second signal processing unit 16 acquires the electric signals indicative of the magnetic field components when the angle detection means detects the reference angle θ(i). The angle computing unit 28 is configured to generate the uncorrected detected angle φ(i) from the signals acquired by the first signal processing unit 14 and the second signal processing unit 16. The angle computing unit 28 may be configured to generate the uncorrected detected angle φ(i) from the arc tangents of the magnetic field components Vx and Vy.

In the meantime, the reference angle θ(i) and the magnetic field components may be acquired at equal time intervals by controlling the rotating body 200 to rotate at a constant speed, without providing the angle detection means such as a rotary encoder. Even with this method, it is possible to acquire the reference angle indicative of an actual rotation angle, and the magnetic field components corresponding to the reference angle.

The angle error calculation unit 24 is configured to generate an angle error Δθ(i), based on the reference angle θ(i) and the uncorrected detected angle φ(i). The angle error calculation unit 24 may be configured to calculate a difference between the uncorrected detected angle φ(i) and the reference angle θ(i), as the angle error Δθ(i).

The correction value calculation unit 26 is configured to calculate the correction value, based on the angle error Δθ(i). The correction value calculation unit 26 may be configured to calculate the correction value, based on an amplitude value of each order and by expanding the angle error Δθ(i) at the reference angle θ by the Fourier series. The amplitude value of each order (for example, each amplitude value of sin1θ, cos1θ, sin2θ and cos2θ) corresponds to the amplitude value of each order on the right side in an equation (3). The correction value calculation unit 26 may be configured to calculate the correction values $A_1$, $B_1$, $A_2$ and $B_2$ in the equation (3) from the amplitude value of each order of the Fourier series of the angle error Δθ(i).

[Math 3]

$$A_1=-Ox \quad (4)$$

$$B_1=+Oy \quad (5)$$

$$A_2 = -\alpha \quad (6)$$

$$B_2 = -\beta \quad (7)$$

The correction value calculation unit 26 is configured to set the calculated correction values in the angle computing unit 28. The angle computing unit 28 is configured to generate the corrected detected angle φo, based on the set correction values. The calculation and setting of the correction values may be performed just once when the rotation angle detection device 100 starts an operation, may be performed periodically or may be performed depending on variation in surrounding environments.

Figure 3:
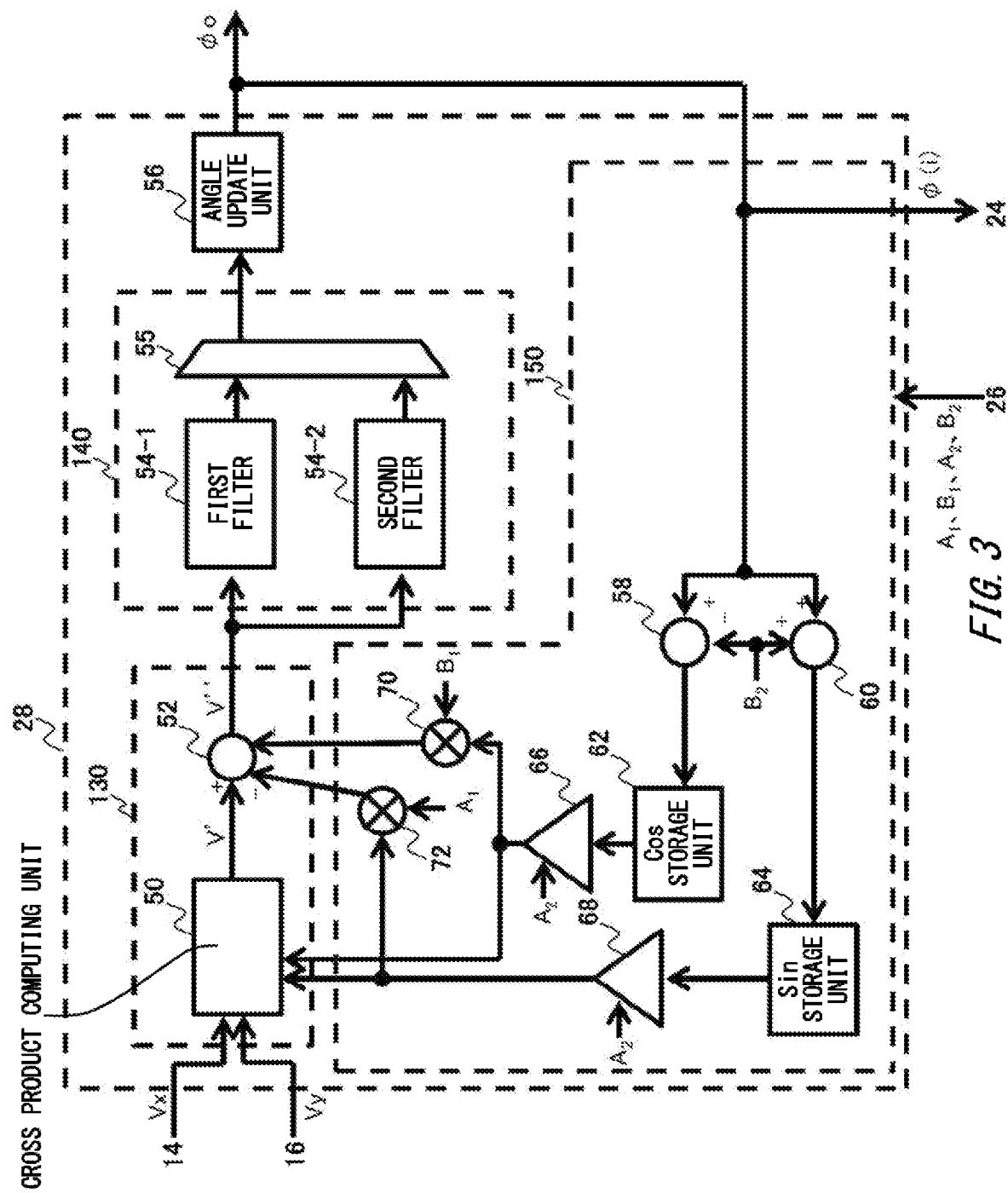
FIG. 3 shows a configuration example of an angle computing unit 28.

FIG. 3 shows a configuration example of the angle computing unit 28. In the present example, the angle computing unit 28 includes a first computing unit 130, a filter unit 140, an angle update unit 56, and a feedback unit 150. These configurations form a closed loop in which computing using the angle output signal φ output by the angle update unit 56 and the correction values is repeatedly performed for the magnetic field detection signals Vx and Vy and the angle output signal is thus approximated to the reference angle θ.

The first computing unit 130 is configured to output a first computing signal V" corresponding to the magnetic field detection signals Vx and Vy. When the rotation angle detection device 100 calculates the correction values, the first computing unit 130 is input with the magnetic field detection signals Vx and Vy, and outputs the first computing signal V" not corrected by the correction values. When the rotation angle detection device 100 outputs the corrected detected angle φo, the first computing unit 130 is input with the magnetic field detection signals Vx and Vy and a magnetic field correction signal, and outputs the first computing signal V" corrected by the correction values. In the present example, the first computing signal V" is a signal indicative of angular acceleration of the rotating body 200. The first computing signal V" may be a signal indicative of the rotation angle of the rotating body 200 or may be a signal indicative of an angular velocity of the rotating body 200.

In the present example, the filter unit 140 is configured to input a signal, which is obtained by filtering the output (i.e., the first computing signal V") from the first computing unit 130, to the angle update unit 56. The filter unit 140 is a filter capable of selecting a first filter characteristic and a second filter characteristic different from the first filter characteristic. The first filter characteristic is used so as to output the angle output signal φ. The second filter characteristic is used so as to calculate the correction values. In the present example, the filter unit 140 includes a first filter 54-1 having the first filter characteristic, a second filter 54-2 having the second filter characteristic, and a selection unit 55. In the present example, the first filter 54-1 and the second filter 54-2 are provided in parallel, and are filters to which a common signal is to be input. The selection unit 55 is configured to select and output any one of a signal having passed through the first filter 54-1 and a signal having passed through the second filter 54-2. In another example, the filter unit 140 may be a filter capable of switching a setting of the first filter characteristic and a setting of the second filter characteristic in a time division manner.

In the present example, the first filter 54-1 and the second filter 54-2 are input with the first computing signal V", respectively, and output signals filtered with the respective filter characteristics. The selection unit 55 selects the output signal of the second filter 54-2 when calculating the correction values of the rotation angle, and selects the output signal of the first filter 54-1 when calculating the corrected detected angle φo, and outputs the selected signal.

The angle update unit 56 is configured to output an angle output signal indicative of the rotation angle, based on the first computing signal V" caused to pass by the filter unit 140. The angle update unit 56 is an example of the angle output unit configured to output the angle output signal, based on the magnetic field detection signals Vx and Vy and the correction values. The angle update unit 56 may be configured to update and output a value of the angle output signal, based on the first computing signal to be input. For example, the angle update unit 56 is configured to integrate the first computing signal indicative of the angular acceleration to thus generate a signal indicative of the angular velocity, and to integrate signals indicative of the angular velocity to thus generate the angle output signal. When the rotation angle detection device 100 calculates the correction values, the angle update unit 56 is input with a signal filtered using the second filter characteristic, and outputs an uncorrected angle signal. The uncorrected angle signal is a signal indicative of the uncorrected detected angle φ. When the rotation angle detection device 100 outputs the corrected detected angle φo, the angle update unit 56 is input with a signal filtered using the first filter characteristic, and outputs the angle output signal indicative of the corrected detected angle φo. That is, when the selection unit 55 selects the output signal of the second filter 54-2, the angle output signal of the angle update unit 56 corresponds to the uncorrected detected angle φ, and when the selection unit 55 selects the output signal of the first filter 54-1, the angle output signal of the angle update unit 56 corresponds to the corrected detected angle φo.

The feedback unit 150 is configured to generate the magnetic field correction signal, based on the angle output signal output by the angle update unit 56, and to input the same to the first computing unit 130. The first computing unit 130 is configured to generate the first computing signal V", based on the magnetic field correction signal corresponding to a previous angle output signal and the current magnetic field detection signals Vx and Vy. When calculating the correction value, the feedback unit 150 generates the magnetic field correction signal, based on the uncorrected detected angle φ. At this time, the feedback unit 150 does not use the correction values ($A_1$, $B_1$, $A_2$, $B_2$).

When the rotation angle detection device 100 calculates the correction values, the correction value calculation unit 26 calculates the correction values ($A_1$, $B_1$, $A_2$, $B_2$), based on the uncorrected detected angle φ generated without using the correction values ($A_1$, $B_1$, $A_2$, $B_2$). In the present example, the correction value calculation unit 26 is configured to calculate the correction values ($A_1$, $B_1$, $A_2$, $B_2$), based on an error between the uncorrected detected angle φ and the reference angle signal θ, and to set the correction values in the feedback unit 150. When generating the corrected detected angle φ, the feedback unit 150 is input with the angle output signal output by the angle update unit 56 and the correction values ($A_1$, $B_1$, $A_2$, $B_2$), and generates the magnetic field correction signal, based on the angle output signal and the correction values ($A_1$, $B_1$, $A_2$, $B_2$).

When calculating the correction values ($A_1$, $B_1$, $A_2$, $B_2$), the filter unit 140 uses the second filter characteristic, and when calculating the corrected detected angle φ, the filter unit uses the first filter characteristic. Thereby, it is possible to appropriately filter the first computing signal V", to calculate the correction values with accuracy and to calculate the corrected detected angle φ with high accuracy. As an example, a band of the first filter characteristic through which a signal is to pass is narrower than a band of the second filter characteristic through which a signal is to pass. In this case, when generating the corrected detected angle φ, since the first computing signal V" is filtered with the filter having a narrow band, a signal-to-noise ratio of the corrected detected angle φ can be improved. Also, when calculating the correction values, since the first computing signal V" is filtered with the filter having a wide band, error information of the wide band and error information in which phase delay and the like are small can be acquired. For this reason, the correction values can be calculated with accuracy.

In the present example, the first computing unit 130 includes a cross product computing unit 50 and an output unit 52. In the present example, the feedback unit 150 includes output units 58 and 60, a Cos storage unit 62, a Sin storage unit 64, and multiplication units 66, 68, 70 and 72.

The cross product computing unit 50 is configured to multiply the magnetic field detection signal −Vx by an output of the multiplication unit 68, to multiply the magnetic field detection signal Vy by an output of the multiplication unit 66, and to output a sum of multiplication results. The multiplication unit 66; 68 is configured to output a value corresponding to the angle output signal (φ or φo) output by the angle update unit 56 and the correction value $A_2$; $B_2$. In the present example, an output V' of the cross product computing unit 50 is expressed by an equation 4. In the present example, since negative feedback is applied for φ≈θ, sin (θ·φ) is approximated to (θ·φ) and cos β is approximated to 1 by setting β<<1.

[Math 4]

$$V'(\theta) = -Vx(\theta) \cdot \frac{\sin(\phi + B_2)}{1 - A_2} - Vy(\theta) \cdot \frac{\cos(\phi - B_2)}{1 + A_2} \quad (8)$$
$$= \sin(\theta - \phi)\cos 2\beta - \frac{Ox}{1+\alpha}\sin(\phi - \beta) + \frac{Oy}{1-\alpha}\cos(\phi + \beta)$$
$$\cong \frac{Ox}{1+\alpha}\sin(\phi - \beta) + \frac{Oy}{1-\alpha}\cos(\phi + \beta)$$

The output unit 52 is configured to output the first computing signal V" obtained by subtracting an output of the multiplication unit 70 and an output of the multiplication unit 72 from the output V' of the cross product computing unit 50. The multiplication unit 70 is configured to multiply an output of the multiplication unit 66 by the correction value $B_1$ and to output a result of the multiplication. The multiplication unit 72 is configured to multiply an output of the multiplication unit 68 by the correction value $A_1$ and to output a result of the multiplication.

The filter unit 140 is configured to cause a predetermined frequency component of the output V" of the output unit 52 to pass therethrough. As described above, when calculating the correction value and when calculating the corrected detected angle φo, the filter unit 140 uses the different filter characteristics.

The angle update unit 56 is configured to increase or decrease the detected angle, in correspondence to the output of the filter unit 140. In the present example, the angle update unit 56 is configured to update the detected angle so as to approximate the first computing signal V" to zero. In the angle update unit 56, the detected angle when i=0 may be registered as an initial value of the detected angle. The angle update unit 56 may be configured to update and output the detected angle whenever the first computing signal V" is input. As described above, when the feedback unit 150 does not use the correction value, the detected angle of the angle update unit 56 corresponds to the uncorrected detected angle φ, and when the feedback unit 150 uses the correction value, the detected angle of the angle update unit 56 corresponds to the corrected detected angle φo.

The output unit 58 is configured to subtract the correction value $B_2$ from the detected angle output by the angle update unit 56 and to output a result value thereof. The output unit 60 is configured to add the correction value $B_2$ to the detected angle and to output a result value thereof. The Cos storage unit 62 is configured to output a value of cosine corresponding to the angle output by the output unit 58. The Sin storage unit 64 is configured to output a value of sine corresponding to the angle output by the output unit 58. The multiplication unit 66 is configured to multiply the output of the Cos storage unit 62 by $1/(1+A_2)$ and to output a result value thereof. The multiplication unit 68 is configured to multiply the output of the Sin storage unit 64 by $1/(1-A_2)$ and to output a result value thereof.

By the above processing, the first computing signal V" output by the output unit 52 is expressed by an equation 5.

[Math 5]

$$V''(\theta) = V'(\theta) - A_1 \cdot \frac{\sin(\phi + B_2)}{1 - A_2} - B_1 \cdot \frac{\cos(\phi - B_2)}{1 + A_2} \quad (9)$$
$$\cong 0$$

By the processing, each error component is reduced, the loop of the angle computing unit 28 is stabilized at θ≈φ, and the corrected detected angle φo corresponding to the reference angle θ is output. Also, when calculating the correction value and when outputting the corrected detected angle φo, the filter characteristics of the filter unit 140 are selectively used, so that it is possible to accurately calculate the correction values for correcting the error of the detected angle with respect to the reference angle θ and to suppress the noise when calculating the corrected detected angle φo.

Figure 4:
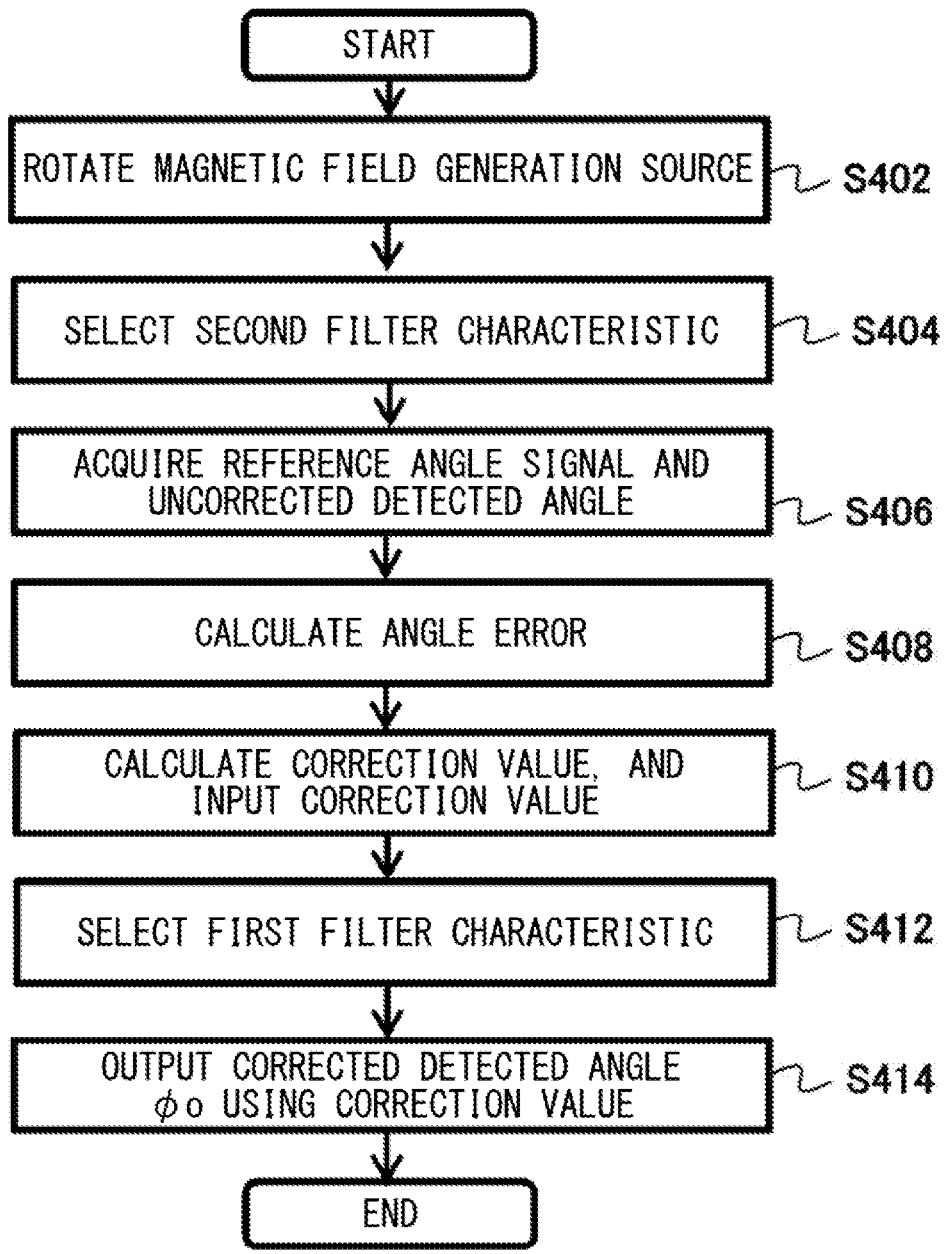
FIG. 4 is a flowchart showing an operation example of the rotation angle detection device 100 having the angle computing unit 28 shown in FIG. 3.

FIG. 4 is a flowchart showing an operation example of the rotation angle detection device 100 having the angle computing unit 28 shown in FIG. 3. In the present example, the rotation angle detection device 100 calculates the correction values in processing from S402 to S410, and outputs the corrected detected angle φo by using the correction values in processing from S412 and S414.

First, in S402, the rotation angle detection device 100 rotates the magnetic field generation source 120. Also, the second filter characteristic of the filter unit 140 is selected. In the example of FIG. 3, the selection unit 55 selects the second filter 54-2. The angle computing unit 28 calculates the uncorrected detected angle φ by using the loop including the second filter 54-2. Next, in S406, the angle error calculation unit 24 acquires the reference angle signal θ(i) and the uncorrected detected angle φ(i). Next, in S408, the angle error calculation unit 24 calculates the angle error corresponding to a difference θ(i)−φ(i) between the reference angle signal θ(i) and the uncorrected detected angle φ(i). Next, in S410, the correction value calculation unit 26 calculates the correction values, based on the angle error, and inputs the same to the feedback unit 150.

Next, in S412, the filter unit 140 selects the first filter characteristic. In the example of FIG. 3, the selection unit 55 selects the first filter 54-1. Next, in S414, the angle update unit 56 outputs the corrected detected angle φo calculated by using the correction values input to the feedback unit 150, and the loop including the first filter 54-1.

By the above processing, it is possible to accurately calculate the correction values for correcting the error of the detected angle with respect to the reference angle θ and to suppress the noise when calculating the corrected detected angle φo. In contrast, a case in which when calculating the correction value and when calculating the corrected detected angle φo, the common filter characteristic of the filter unit 140 is used is described.

In a case in which the angle update unit 56 has two integration units, the angle computing unit 28 is a type 2 servo circuit, and the angle update unit 56 detects the rotation angle so as to follow the reference angle θ. In the case in which the angle update unit 56 has the two integration units, the first computing signal V" corresponds to an angular acceleration obtained by differentiating the detected angle twice with respect to time. When the angular velocity is zero, such as a case in which the rotating body 200 is stationary or rotates at a constant speed, the rotation angle that is detected by the angle update unit 56 is not influenced by gain-phase frequency characteristics of the filter unit 140, and the detected angle is substantially the same as the reference angle θ. On the other hand, when the angular acceleration has a finite value, such as a case in which the rotating body 200 accelerates or decelerates, the rotation angle that is detected by the angle update unit 56 is influenced by gain-phase frequency characteristics of the filter unit 140, and the rotation angle has an error with respect to the reference angle θ.

The corrected detected angle φo that is output by the angle update unit 56 has preferably a low noise. By adjusting the frequency characteristics of the filter unit 140 to a low-pass filter, which is a narrow band with respect to the angular acceleration, it is possible to suppress the noise in the corrected detected angle φo.

When calculating the correction value, the rotation angle is detected without using the correction value, so that the angle error becomes relatively large. In this state, when the rotating body 200 is rotated at a constant speed, the angle changing per unit time is not constant due to the angle error component and a finite angular acceleration component is generated.

Herein, when the low-pass filter characteristic of the narrow band of the filter unit 140 is used, an amplitude and a phase of the angular acceleration component are modulated by the frequency characteristics of the filter unit 140. For this reason, an error due to the frequency characteristics of the angle computing unit 28 is generated in the rotation angle detected by the angle update unit 56. Due to the error, it is difficult to calculate the correction value with accuracy. Also, it is possible to calculate the correction value with accuracy by widening a frequency band of the filter unit 140. However, when the frequency band of the filter unit 140 is widened, the noise in the corrected detected angle φo increases.

In the present example, the filter unit 140 can select the two filter characteristics, so that when calculating the correction value and when outputting the corrected detected angle φo, it is possible to perform the filtering appropriate for each processing by changing the filter characteristics. For this reason, it is possible to calculate the correction value with accuracy and to suppress the noise in the corrected detected angle φo.

Figure 5:
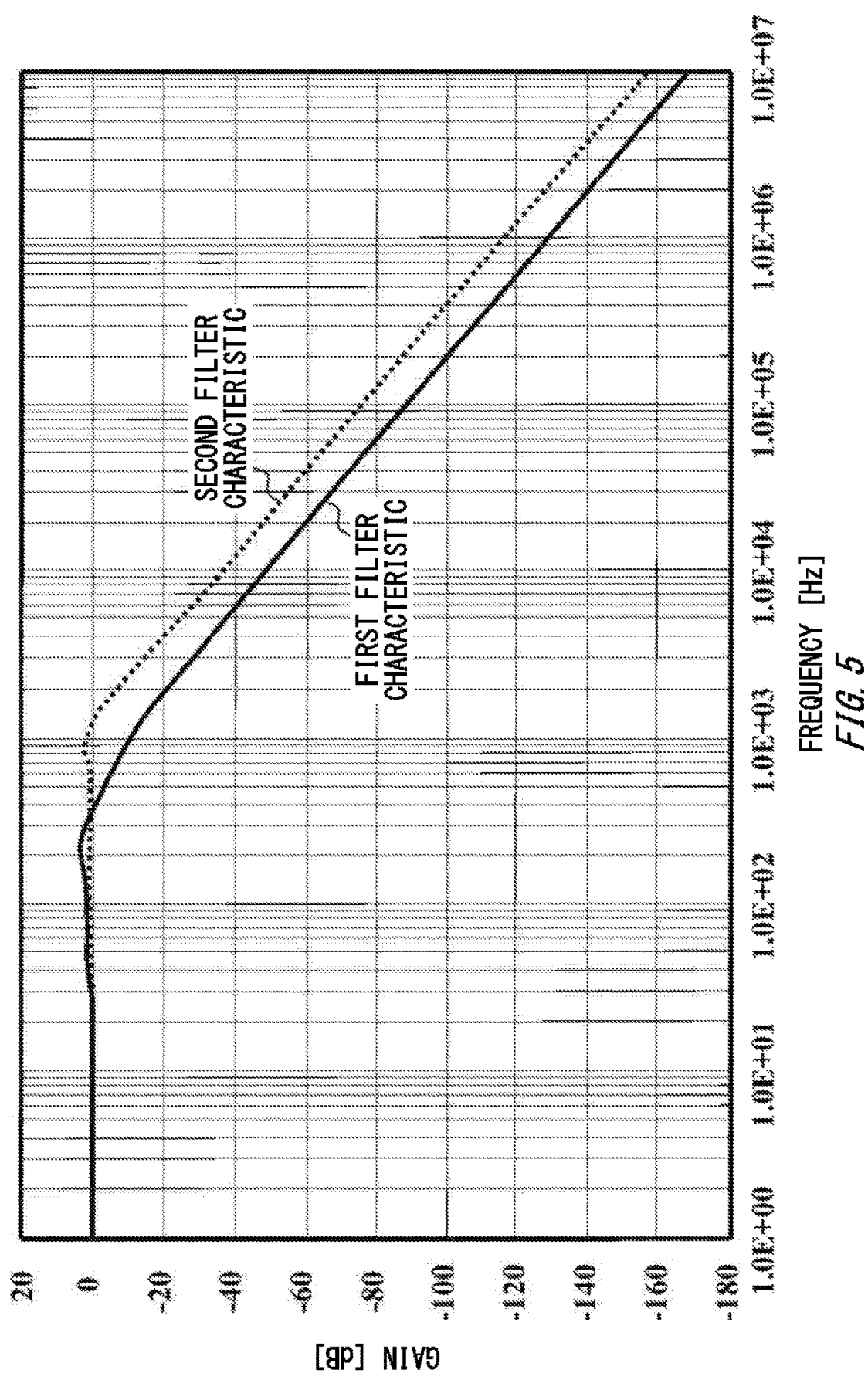
FIG. 5 shows an example of gain-frequency characteristics of a first filter characteristic and a second filter characteristic.

FIG. 5 shows an example of gain-frequency characteristics of the first filter characteristic and the second filter characteristic. As described above, the band of the first filter characteristic through which a signal is to pass is narrower than the band of the second filter characteristic through which a signal is to pass. In the present example, both the first filter characteristic and the second filter characteristic are low-pass filter characteristics. A cutoff frequency of the first filter characteristic may be 80% or lower or 50% or lower of a cutoff frequency of the second filter characteristic. As described above, the second filter characteristic is made as a wide band, so that it is possible to accurately detect the error of the detected angle with respect to the reference angle θ and to calculate the highly accurate correction value. Also, the first filter characteristic is made as a narrow band, so that it is possible to suppress the noise in the corrected detected angle φo.

Figure 6:
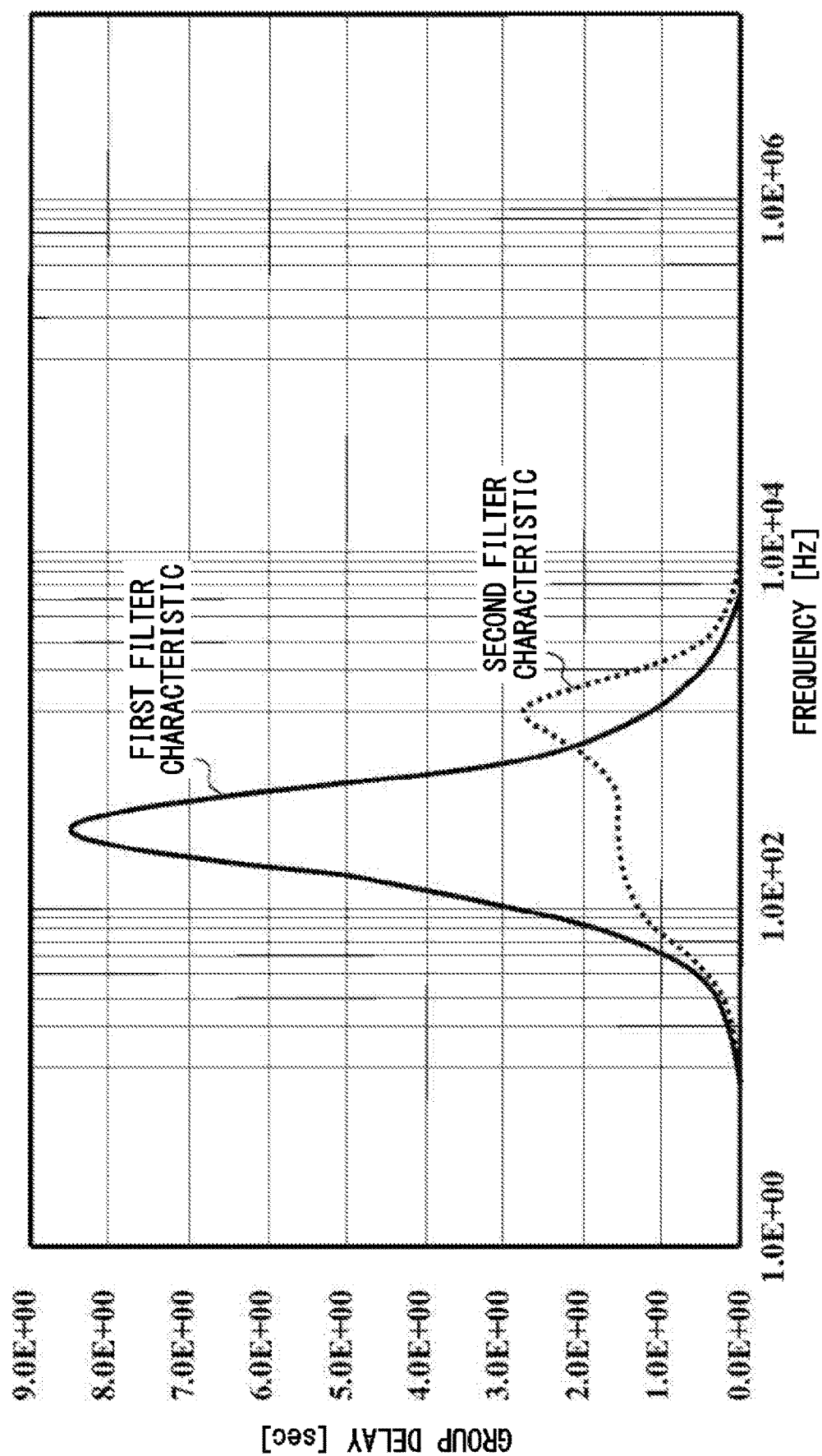
FIG. 6 shows an example of group delay-frequency characteristics of the first filter characteristic and the second filter characteristic.

FIG. 6 shows an example of group delay-frequency characteristics of the first filter characteristic and the second filter characteristic. A peak value of the group delay in the second filter characteristic may be lower than a peak value of the group delay in the first filter characteristic.

In the case in which the angle computing unit 28 is a type 2 servo circuit, a closed loop transfer function can be expressed by a transfer function of an equation (6).

[Math 6]

$$H_{open} = \frac{K}{s^2} \cdot \frac{1+st_1}{1+st_2} \quad (10)$$

$$H_{closed} = \frac{H_{open}}{1+H_{open}} \quad (11)$$

$H_{open}$ is a transfer function when a part of the closed loop is opened. $H_{closed}$ is a transfer function of the closed loop. Also, K is a loop gain, s is a Laplace's operator, $t_1$ is a phase advance element for phase compensation, and $t_2$ is a phase delay element. For example, when the first filter characteristic is used, the closed loop transfer function of the angle computing unit 28 is expressed by an equation (11), and when the second filter characteristic is used, the closed loop transfer function of the angle computing unit 28 may be such a function in which K and $t_1$ in the equation (11) are respectively doubled or more. FIGS. 5 and 6 shows the frequency characteristics when K and ti in the case in which the second filter characteristic is used are doubled, as compared to the case in which the first filter characteristic is used. As described above, the first filter 54-1 and the second filter 54-2 may be two filter circuits having different design parameters or a filter coefficient of the common filter circuit may be switched.

Figure 7:
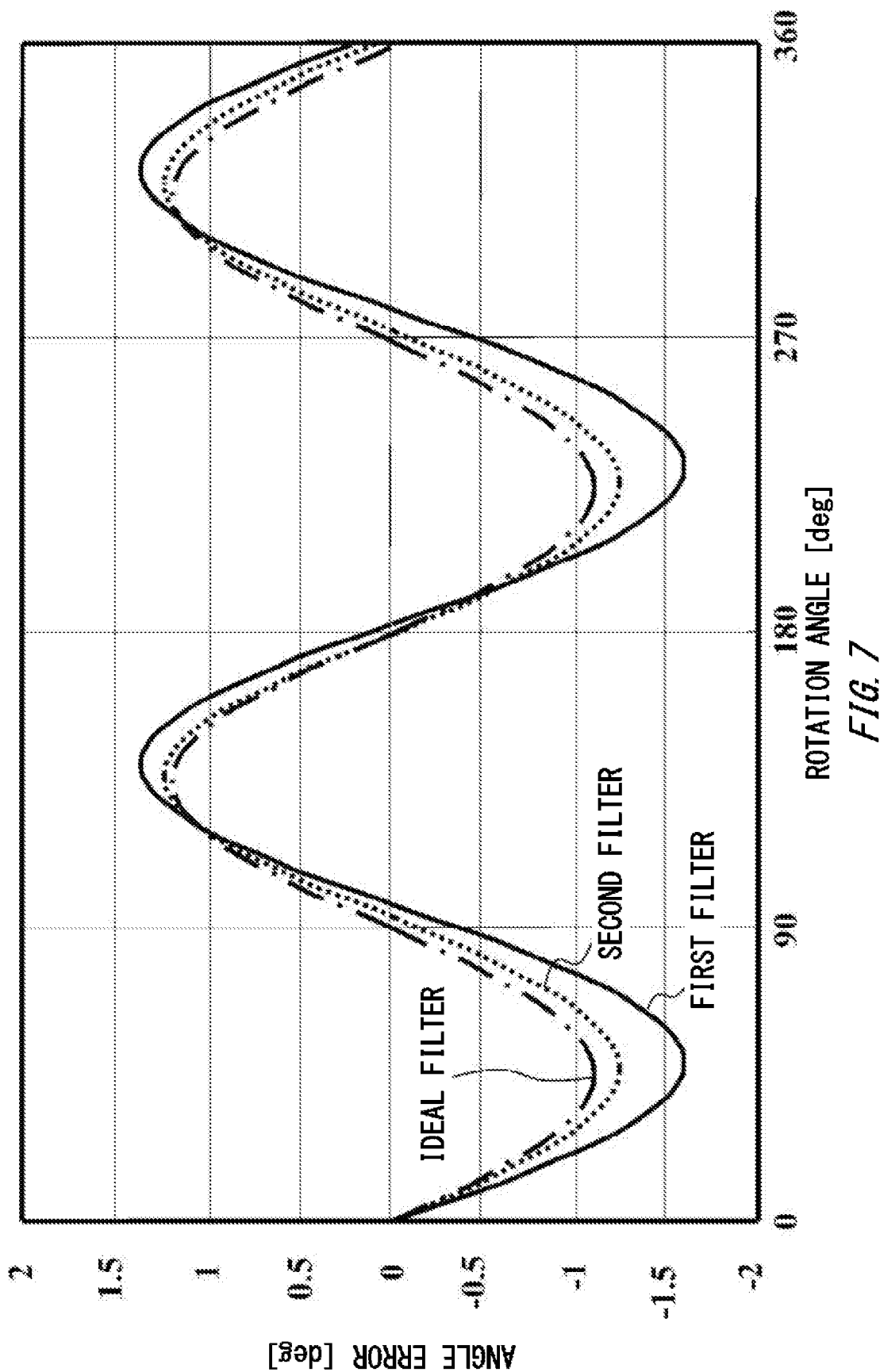
FIG. 7 shows an example of angle error characteristics when α=0.02 and β=Ox=Oy=0.

FIG. 7 shows an example of angle error characteristics when α=0.02 and β=Ox=Oy=0. FIG. 7 shows the angle error Δθ(i) that is acquired when each of the first filter 54-1, the second filter 54-2 and an ideal filter is selected by the filter unit 140. The ideal filter is a filter of which gain is 1 and the phase delay is zero until the infinite band. The angle error Δθ(i) that is obtained when the ideal filter is used is an expected value of the angle error Δθ(i). It can be seen that the angle error Δθ(i) acquired using the second filter 54-2 is closer to the expected value, as compared to the angle error Δθ(i) acquired using the first filter 54-1. That is, it can be seen that when the second filter 54-2 is used, the angle error Δθ(i) can be detected with accuracy and the correction value can be thus calculated with accuracy.

Figure 8:
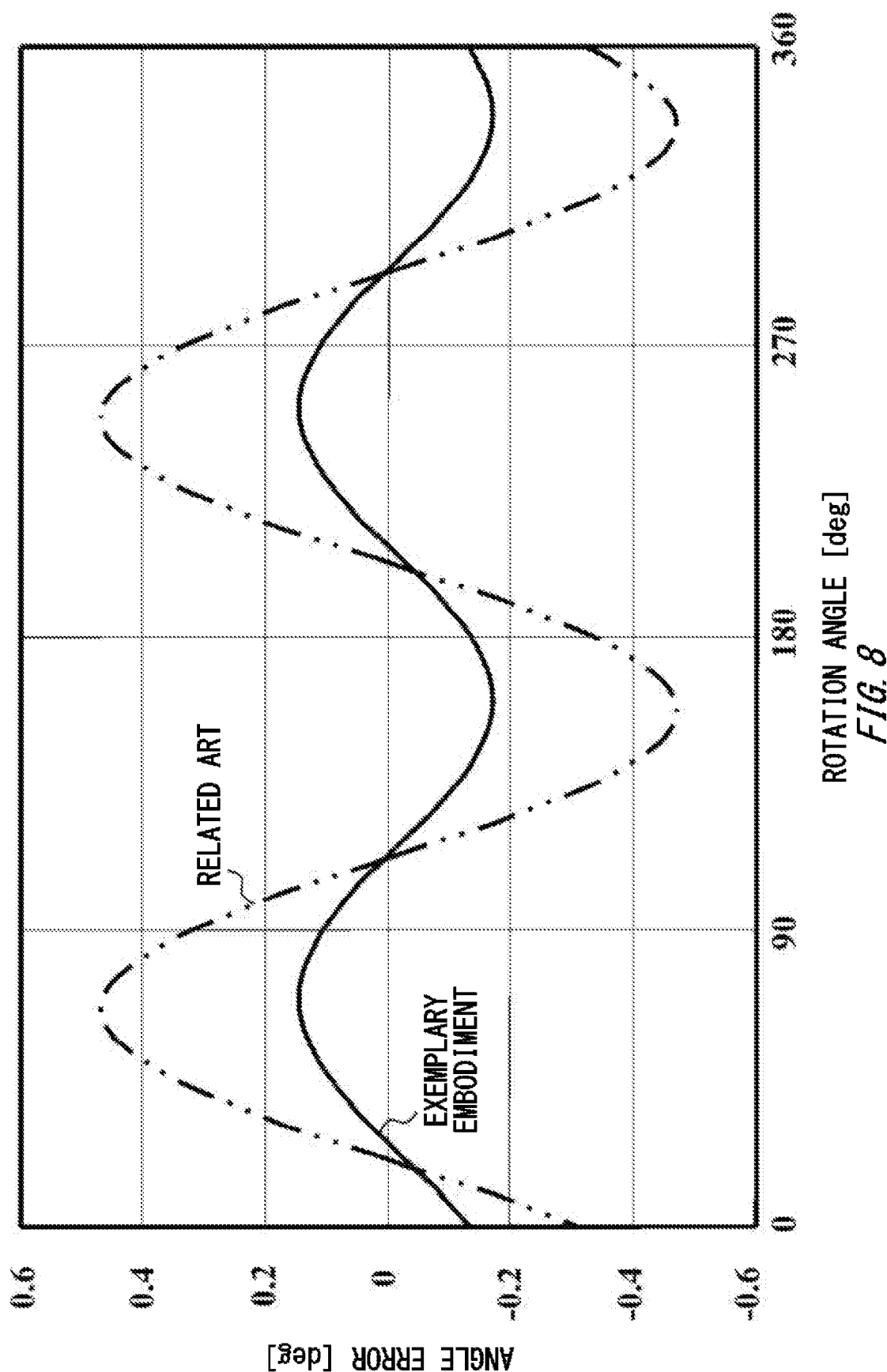
FIG. 8 shows an example of angle error characteristics of corrected detected angle φo calculated using correction values.

FIG. 8 shows an example of angle error characteristics of the corrected detected angle φo calculated using the correction values. In FIG. 8, the characteristic shown as the related art is a characteristic obtained in a case in which the first filter 54-1 is used when acquiring the correction value and when calculating the corrected detected angle φo. In FIG. 8, the characteristic shown as the embodiment is a characteristic obtained in a case in which the second filter 54-2 is used when acquiring the correction value and the first filter 54-1 is used when calculating the corrected detected angle φo. It is possible to obtain the higher correction effect by switching the filter characteristics of the filter unit 140, and to suppress the noise by using the filter characteristic of the narrow band.

Figure 9:
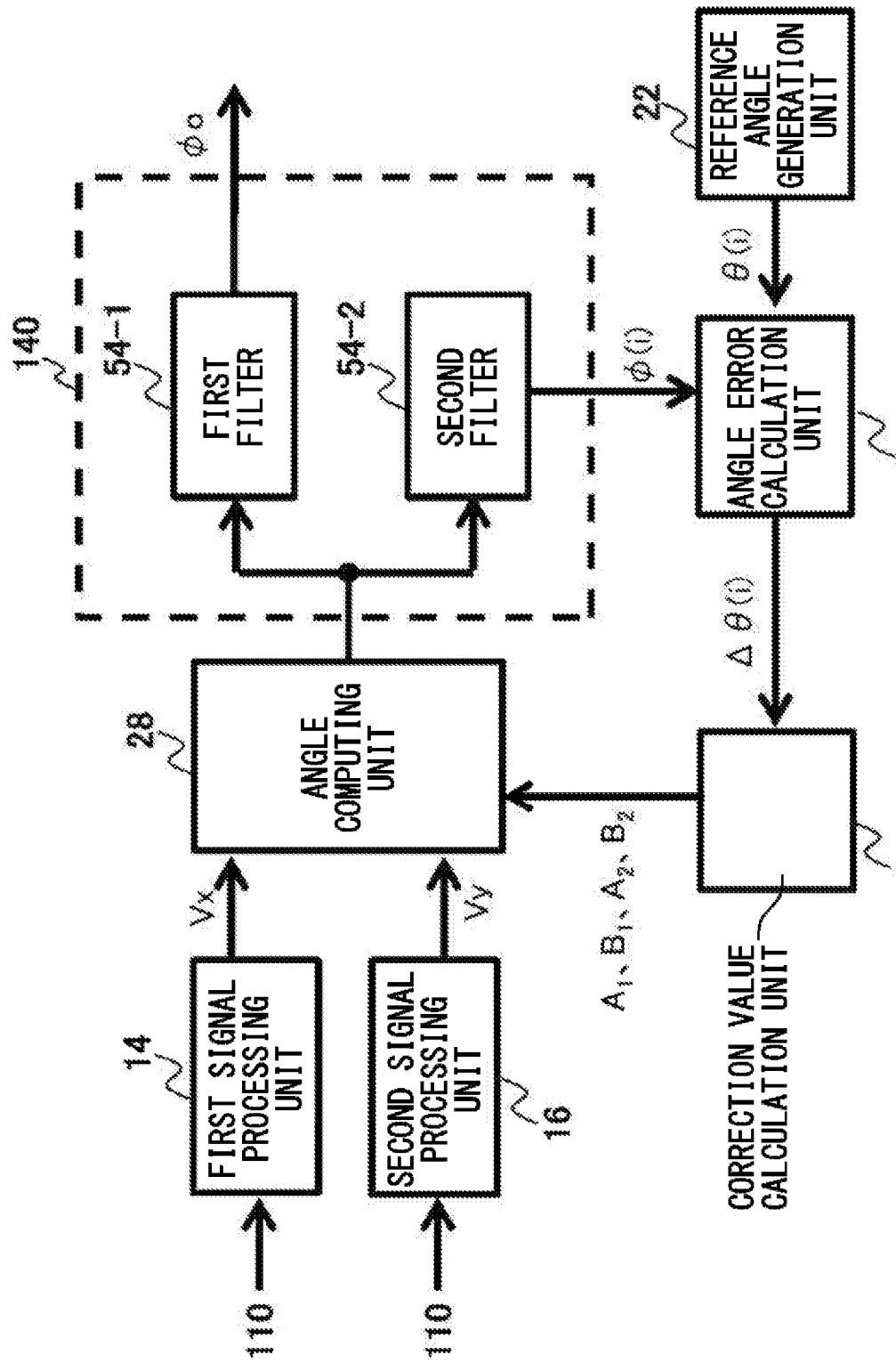
FIG. 9 shows another example of the rotation angle detection device 100.

FIG. 9 shows another example of the rotation angle detection device 100. The rotation angle detection device 100 of the present example is different from the rotation angle detection device 100 described with reference to FIGS. 1 to 8, in that the filter unit 140 is arranged at a rear stage of the angle computing unit 28. The other structures are the same as the rotation angle detection device 100 described with reference to FIGS. 1 to 8. The angle computing unit 28 of the present example may have a filter between the angle update unit 56 and the first computing unit 130 or may not have the same.

The angle error calculation unit 24 and the correction value calculation unit 26 are configured to detect the angle error and to calculate the correction value, based on the angle signal output by the angle computing unit 28 without using the correction value. When calculating the correction value of the rotation angle, the filter unit 140 of the present example filters the angle signal output from the angle computing unit 28 by using the second filter characteristic, and inputs the filtered signal to the correction value calculation unit 26. In the present example, the filter unit 140 inputs the filtered signal to the angle error calculation unit 24, and the angle error calculated by the angle error calculation unit 24 is input to the correction value calculation unit 26. Also, when generating the corrected detected angle φo by using the correction value, the filter unit 140 filters the angle signal output from the angle computing unit 28 by using the first filter characteristic, and outputs the filtered signal as the corrected detected angle φo.

The filter unit 140 of the present example includes the first filter 54-1 and the second filter 54-2. The filter characteristics of the first filter 54-1 and the second filter 54-2 may be the same as the filter characteristics of the first filter 54-1 and the second filter 54-2 described with reference to FIGS. 1 to 8. In another example, the first filter 54-1 and the second filter 54-2 may be adaptive filters configured to estimate states from previous output information in a time domain and to dynamically switch the bands. In this case, the first filter 54-1 and the second filter 54-2 may be two filters having different responsiveness or may implement two filter characteristics by control of turning on and off a band switching function of one filter.

The first filter 54-1 is configured to output the corrected detected angle φo, based on the angle signal output by the angle computing unit 28. In the present example, the first filter 54-1 functions as the angle output unit. The second filter 54-2 is configured to output the uncorrected detected angle φ, based on the angle signal output by the angle computing unit 28. The first filter 54-1 and the second filter 54-2 may operate in parallel or only one filter may selectively operate.

Figure 10:
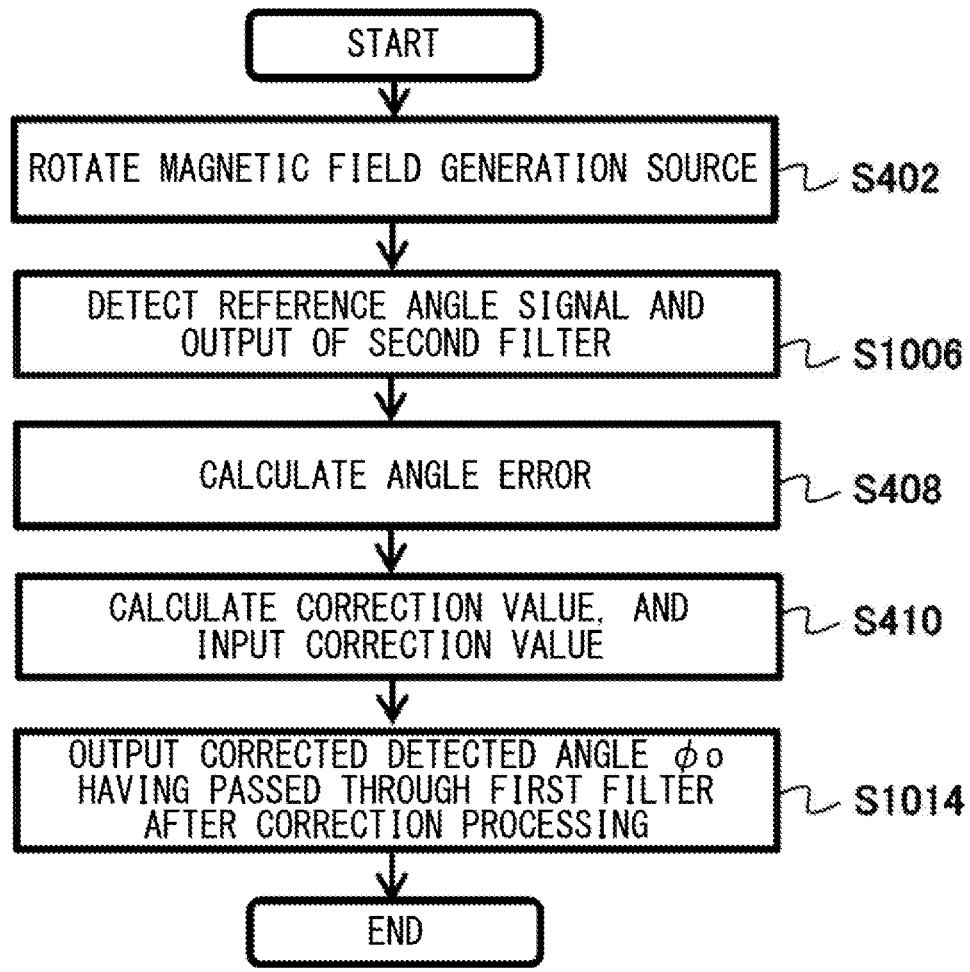
FIG. 10 is a flowchart showing an operation example of the rotation angle detection device 100 shown in FIG. 9.

FIG. 10 is a flowchart showing an operation example of the rotation angle detection device 100 shown in FIG. 9. The rotation angle detection device 100 of the present example calculates the correction values in processing from S402 to S410, and outputs the corrected detected angle φo by using the correction values in processing of S1014. The processing of S402, S408 and S410 is similar to the processing of S402, S408 and S410 described in FIG. 4.

In S1006 after S402, the angle error calculation unit 24 acquires the reference angle signal θ(i) and the uncorrected detected angle φ(i). In S1006, the angle computing unit 28 outputs the uncorrected detected angle φ(i) generated without using the correction value. The second filter 54-2 causes the uncorrected detected angle φ(i) to pass therethrough, in correspondence to the second filter characteristic. The angle error calculation unit 24 acquires the uncorrected detected angle φ(i) output by the second filter 54-2. In S408 and S410, the angle error calculation unit 24 and the correction value calculation unit 26 calculate the angle error and the correction values, and set the correction values in the angle computing unit 28.

In S1014 after S410, the first filter 54-1 causes the angle signal, which is generated using the correction values of the angle computing unit 28, to pass therethrough and outputs the same as the corrected detected angle φo. Even with the above processing, it is possible to accurately calculate the correction values for correcting the error of the detected angle with respect to the reference angle θ, and to suppress the noise when calculating the corrected detected angle φo.

Figure 11:
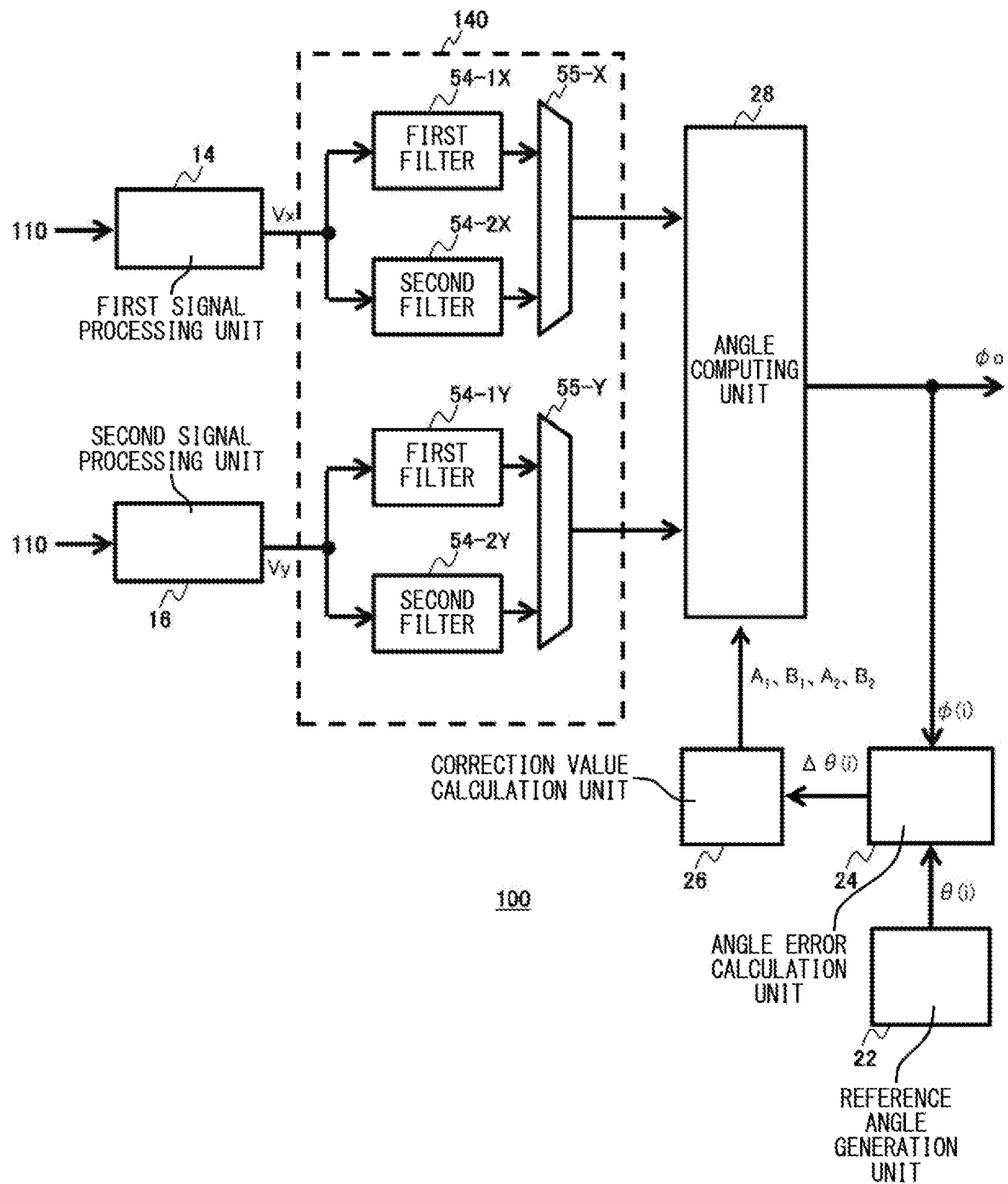
FIG. 11 shows another configuration example of the rotation angle detection device 100.

FIG. 11 shows another configuration example of the rotation angle detection device 100. The rotation angle detection device 100 of the present example is different from the rotation angle detection device 100 described with reference to FIGS. 1 to 8, in that the filter unit 140 is arranged at a front stage of the angle computing unit 28. The other structures are the same as the rotation angle detection device 100 described with reference to FIGS. 1 to 8. In the present example, the angle computing unit 28 functions as the angle output unit. The angle computing unit 28 of the present example may have a filter between the angle update unit 56 and the first computing unit 130 or may not have the same.

When calculating the correction value, the filter unit 140 of the present example filters the magnetic field detection signals Vx and Vy by using the second filter characteristic, and inputs the filtered signals to the angle computing unit. Also, when detecting the corrected detected angle φo by using the correction value, the filter unit 140 filters the magnetic field detection signals Vx and Vy by using the first filter characteristic, and inputs the filtered signals to the angle computing unit 28.

As an example, the filter unit 140 includes a first filter 54-1X, a second filter 54-2X and a selection unit 55-X for the magnetic field detection signal Vx, and includes a first filter 54-1Y, a second filter 54-2Y and a selection unit 55-Y for the magnetic field detection signal Vy. The first filter 54-1 (X/Y), the second filter 54-2 (X/Y) and the selection unit 55-(X/Y) have similar functions to the first filter 54-1, the second filter 54-2 and the selection unit 55 in the example shown in FIGS. 1 to 8. The first filter 54-1X and the first filter 54-1Y may have the same filter characteristic. The second filter 54-2X and the second filter 54-2Y may have the same filter characteristic.

Figure 12:
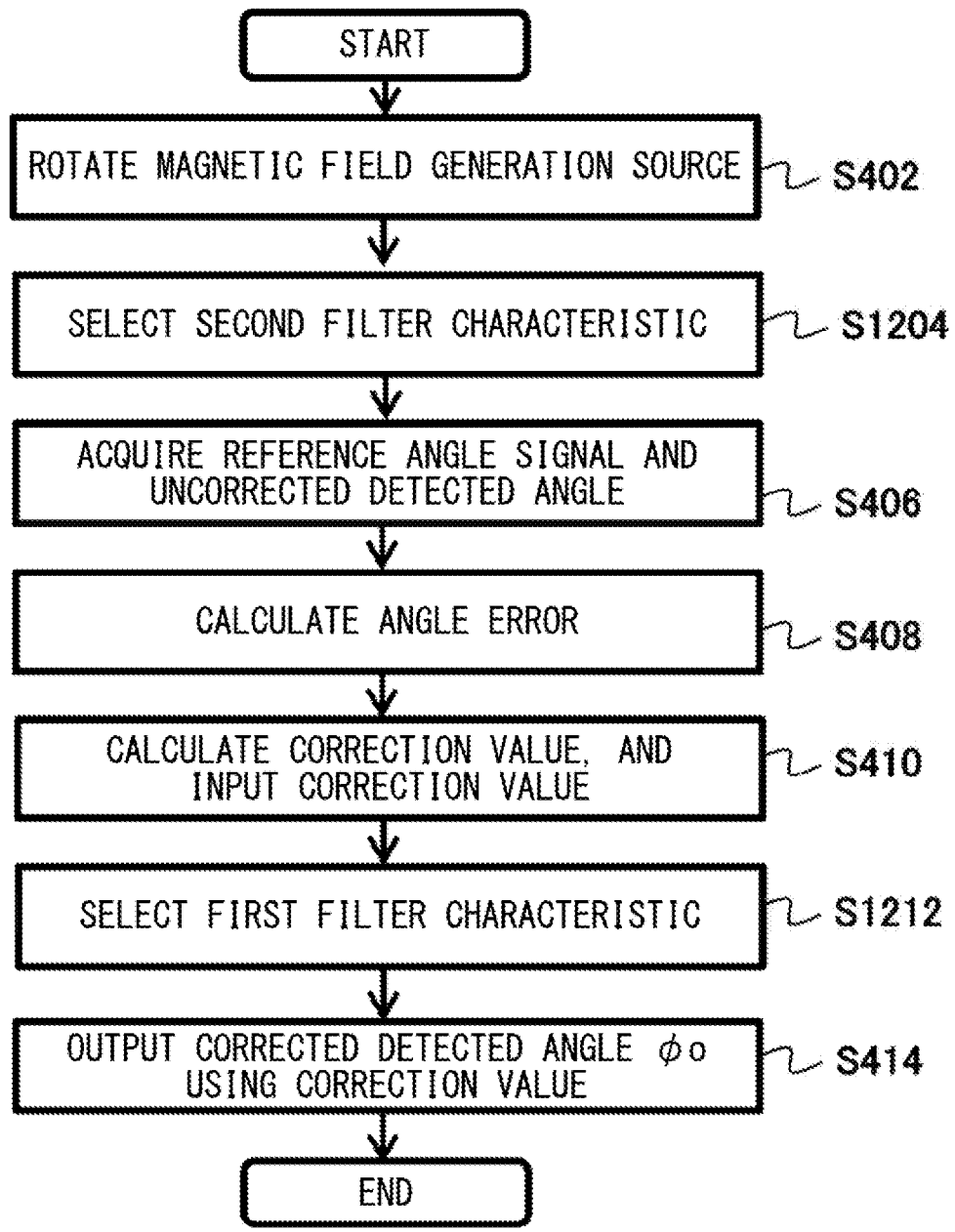
FIG. 12 is a flowchart showing an operation example of the rotation angle detection device 100 shown in FIG. 11.

FIG. 12 is a flowchart showing an operation example of the rotation angle detection device 100 shown in FIG. 11. The rotation angle detection device 100 of the present example calculates correction values in processing from S402 to S410, and outputs the corrected detected angle φo by using the correction values in processing of S1212 and S414. The processing of S402, S406, S408, S410 and S414 is similar to the processing of S402, S406, S408, S410 and S414 of FIG. 4.

In S1204 after S402, the filter unit 140 selects the second filter characteristic. In the present example, the filter unit 140 selects the second filter 54-2. Next, in S406, the angle computing unit 28 generates the uncorrected detected angle φ(i), based on the magnetic field detection signal having passed through the second filter 54-2. In S406, the angle error calculation unit 24 acquires the reference angle signal θ(i) and the uncorrected detected angle φ(i). In S408 and S410, the angle error calculation unit 24 and the correction value calculation unit 26 calculate the angle error and the correction values, and sets the correction values in the angle computing unit 28.

In S1212 after S410, the filter unit 140 selects the first filter characteristic. In the present example, the filter unit 140 selects the first filter 54-1. Next, in S414, the angle computing unit 28 outputs the corrected detected angle φo, based on the magnetic field detection signal having passed through the first filter 54-1. Even with the above processing, it is possible to accurately calculate the correction values for correcting the error of the detected angle with respect to the reference angle θ, and to suppress the noise when calculating the corrected detected angle φo.

Figure 13:
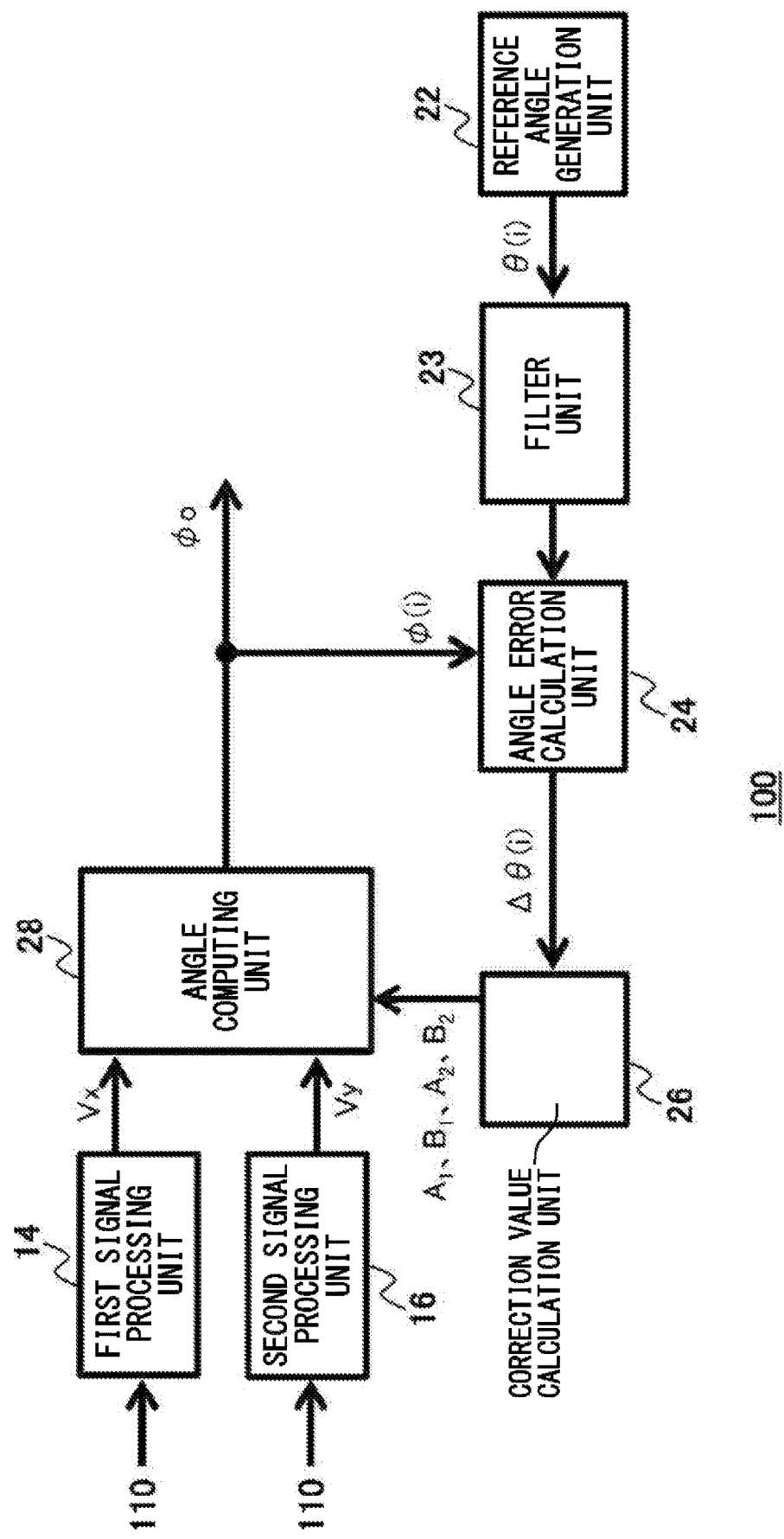
FIG. 13 shows another configuration example of the rotation angle detection device 100.

FIG. 13 shows another configuration example of the rotation angle detection device 100. In the present example, the rotation angle detection device 100 is different from any one rotation angle detection device 100 described with reference to FIGS. 1 to 12, in that it includes a filter unit 23 between the reference angle generation unit 22 and the angle error calculation unit 24. The structures except the filter unit 23 are the same as any one rotation angle detection device 100 described with reference to FIGS. 1 to 12. The rotation angle detection device 100 shown in FIG. 13 does not have the filter unit 140, but may have any one filter unit 140 described with reference to FIGS. 1 to 12.

The filter unit 23 has a preset delay characteristic. The filter unit 23 may have the same delay characteristic as a delay characteristic in the closed loop of the angle computing unit 28. The same delay characteristic may indicate that an error of a frequency at which a delay amount is largest is less than 10% and an error of the maximum delay amount is less than 10% in delay amount-frequency characteristics, for example.

The filter unit 23 is provided, so that it is possible to reduce a phase difference between the uncorrected detected angle φ, which is to be input to the angle error calculation unit 24, and the reference angle θ. Thereby, it is possible to accurately acquire the angle error, and to accurately calculate the correction value.

Figure 14:
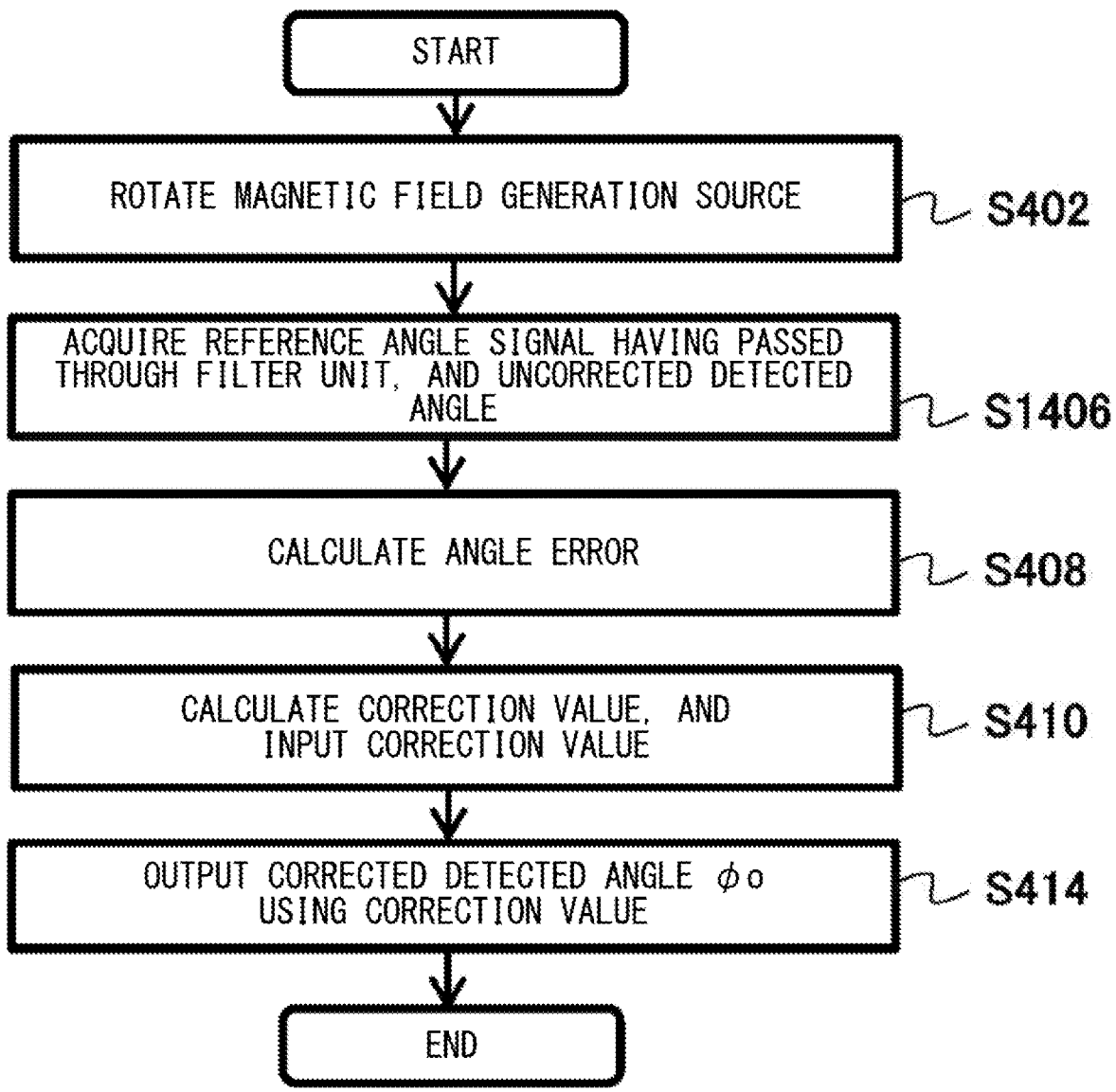
FIG. 14 is a flowchart showing an operation example of the rotation angle detection device 100 shown in FIG. 13.

FIG. 14 is a flowchart showing an operation example of the rotation angle detection device 100 shown in FIG. 13. The rotation angle detection device 100 of the present example calculates correction values in processing from S402 to S410, and outputs the corrected detected angle φo by using the correction values in processing of S414. The processing of S402, S408, S410 and S414 is similar to the processing of S402, S408, S410 and S414 described with reference to FIG. 4.

In S1406 after S402, the filter unit 23 causes the reference angle signal θ(i) to pass therethrough. In S1406, the angle error calculation unit 24 acquires the uncorrected detected angle φ generated by the angle update unit 56 of the angle computing unit 28 without using the correction values, and the reference angle θ(i) having passed through the filter unit 23. In S408 and S410, the angle error calculation unit 24 and the correction value calculation unit 26 calculate the angle error and the correction values, based on the reference angle θ(i) having passed through the filter unit 23 and the uncorrected detected angle φ, and sets the correction values in the angle computing unit 28. In S414 after S410, the angle computing unit 28 outputs the corrected detected angle φo by using the set correction values.

Figure 15:
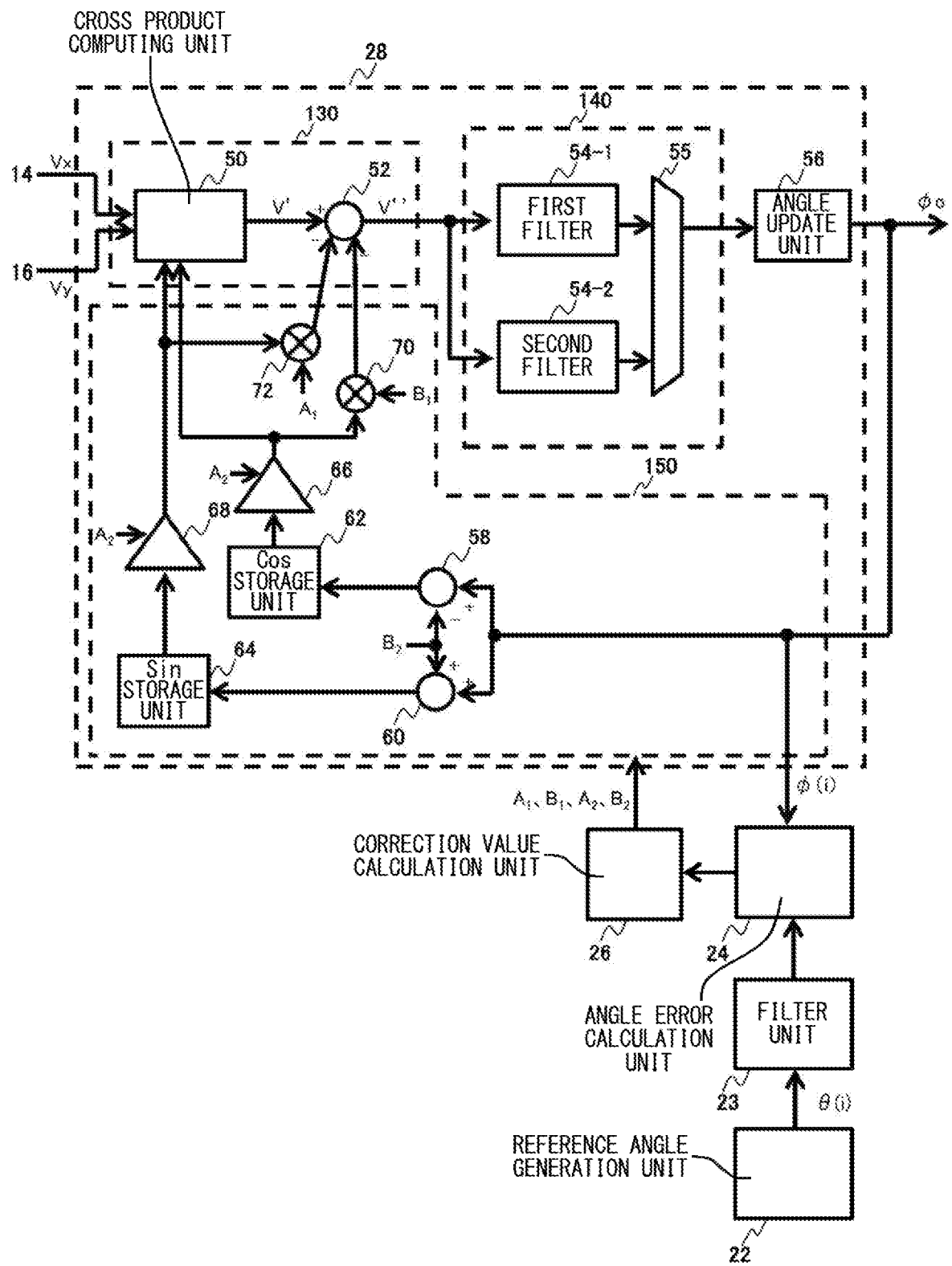
FIG. 15 shows another configuration example of the rotation angle detection device 100.

FIG. 15 shows another configuration example of the rotation angle detection device 100. The rotation angle detection device 100 includes any one filter unit 140 described with reference to FIGS. 1 to 12, and the filter unit 23 described with reference to FIGS. 13 and 14. In the example of FIG. 15, the rotation angle detection device 100 includes the filter unit 140 shown in FIG. 3, and the filter unit 23.

In the present example, the angle error Δθ is detected, based on the uncorrected detected angle φ generated using the second filter 54-2 and the reference angle θ having passed through the filter unit 23. Also, the corrected detected angle φo is generated using the first filter 54-1. Even with the configuration, it is possible to accurately calculate the correction values for correcting the error of the detected angle with respect to the reference angle θ, and to suppress the noise when calculating the corrected detected angle φo.

The second filter 54-2 and the filter unit 23 may have different filter characteristics. As an example, the second filter 54-2 is a filter configured to implement a gain characteristic of the target filter characteristics, and the filter unit 23 is a filter configured to implement a delay characteristic of the target filter characteristics. The functions are dispersed in this way, so that it is possible to reduce a computing load and a circuit area of the angle computing unit 28. The filter unit 23 may also be a filter having a narrower band than the first filter 54-1.

Figure 16:
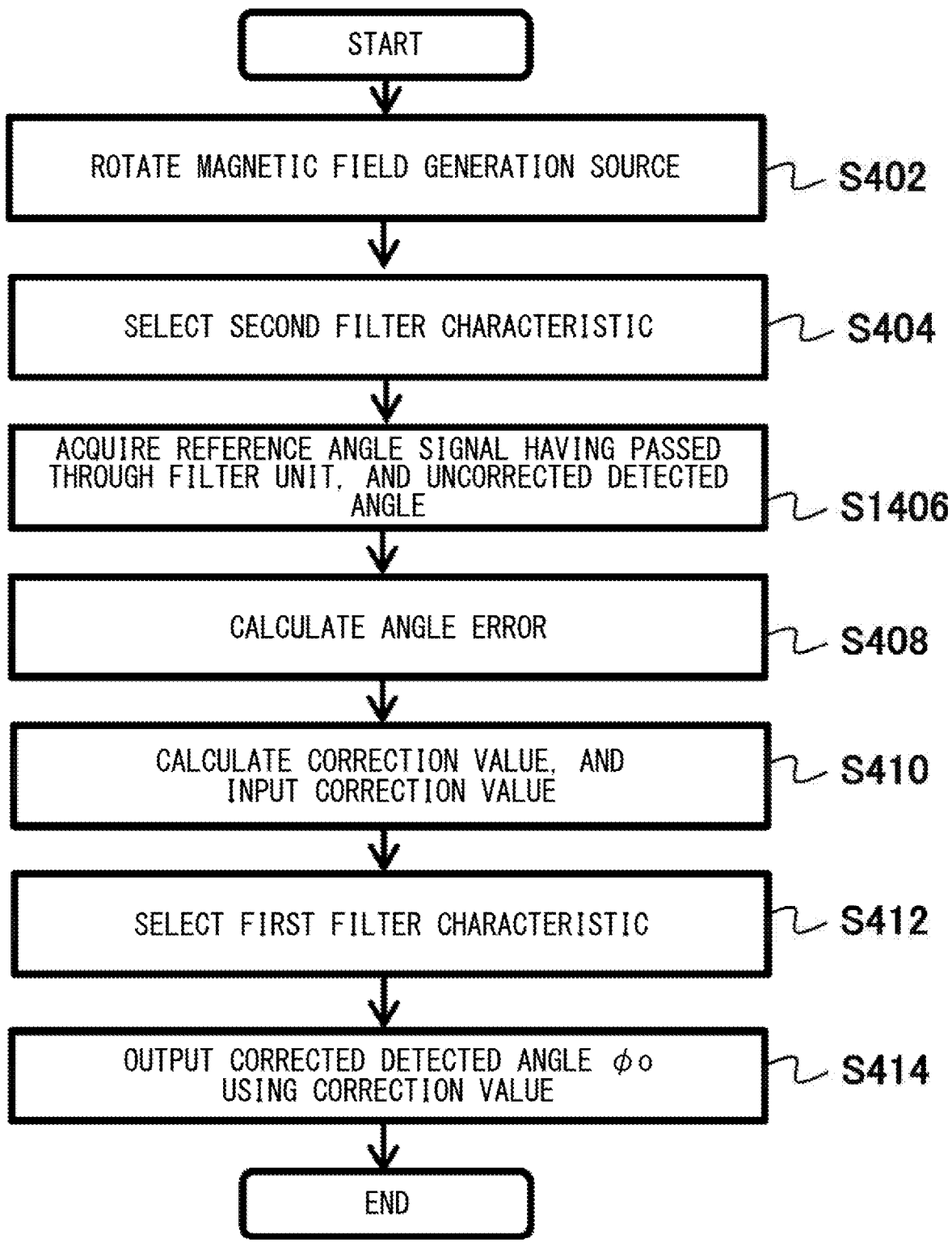
FIG. 16 is a flowchart showing an operation example of the rotation angle detection device 100 shown in FIG. 15.

FIG. 16 is a flowchart showing an operation example of the rotation angle detection device 100 shown in FIG. 15. The rotation angle detection device 100 of the present example calculates correction values in processing from S402 to S410, and outputs the corrected detected angle φo by using the correction values in processing of S1212 and S414. The processing of S402, S404, S408, S410, S412 and S414 is similar to the processing of S402, S404, S408, S410, S412 and S414 described with reference to FIG. 4.

In S1406 after S404, the angle error calculation unit 24 acquires the reference angle θ having passed through the filter unit 23, and the uncorrected detected angle φ. In S408 and S410, the angle error calculation unit 24 and the correction value calculation unit 26 calculate the angle error and the correction values, and set the correction values in the angle computing unit 28. In S412 and S414, the angle computing unit 28 selects the first filter characteristic, and outputs the corrected detected angle φo by using the correction values. Even with the above processing, it is possible to accurately calculate the correction values for correcting the error of the detected angle with respect to the reference angle θ, and to suppress the noise when calculating the corrected detected angle φo.

Figure 17:
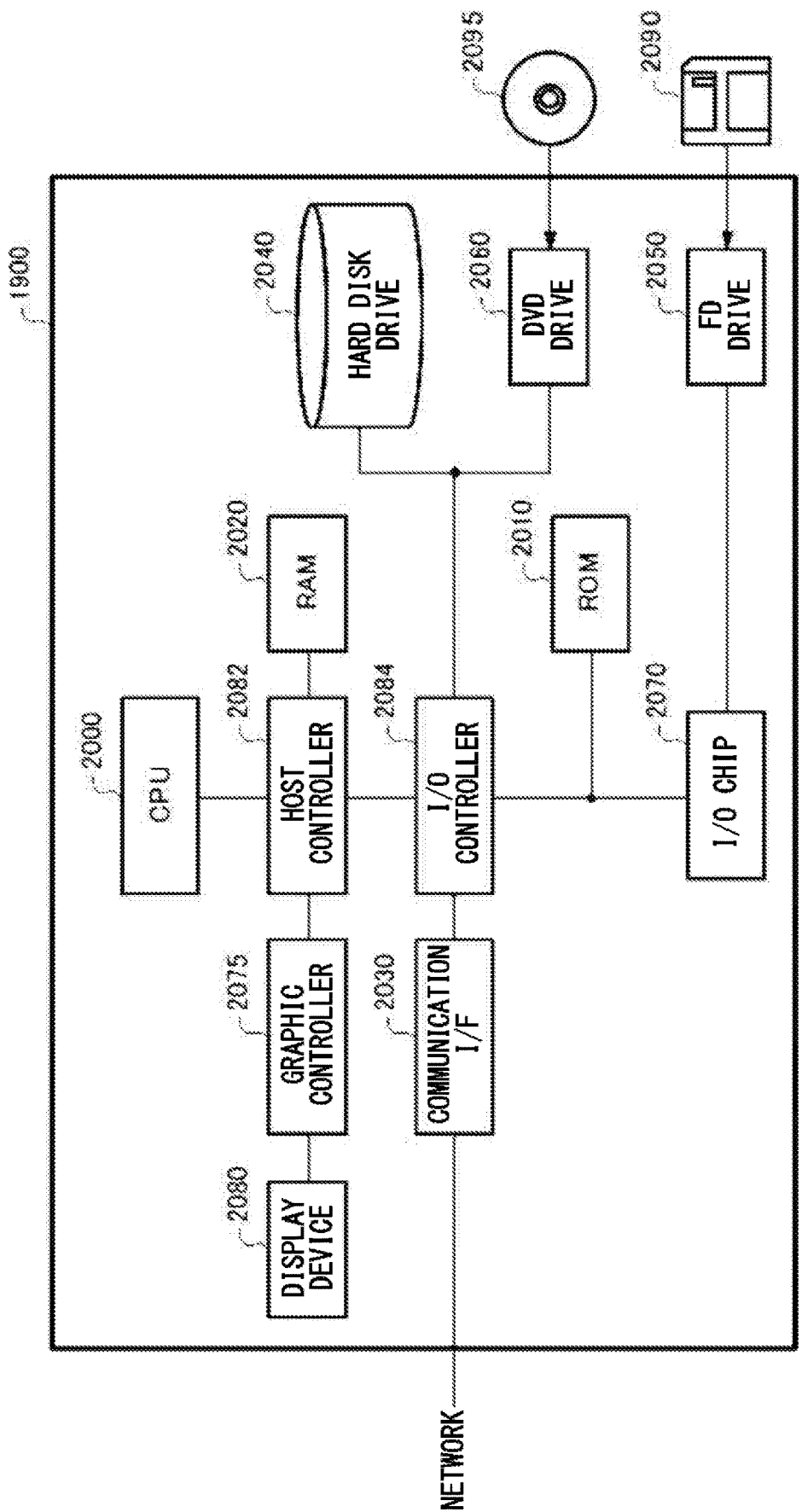
FIG. 17 shows an example of a hardware configuration of a computer 1900 functioning as the rotation angle detection device 100.

FIG. 17 shows an example of a hardware configuration of a computer 1900 functioning as the rotation angle detection device 100. Also, a plurality of computers may function as the rotation angle detection device 100 in cooperation with each other.

The computer 1900 of the present embodiment includes CPU peripheral units having a CPU 2000, a RAM 2020, a graphic controller 2075, and a display device 2080, which are mutually connected by a host controller 2082, input/output units having a communication interface 2030, a hard disk drive 2040, and a DVD drive 2060, which are connected to the host controller 2082 by an input/output controller 2084, and legacy input/output units having a ROM 2010, a flexible disk drive 2050 and an input/output chip 2070 connected to the input/output controller 2084.

The host controller 2082 is configured to mutually connect the RAM 2020, the CPU 2000 configured to access the RAM 2020 at a high transfer rate, and the graphic controller 2075. The CPU 2000 is configured to operate, based on programs stored in the ROM 2010 and the RAM 2020, thereby controlling each unit. The graphic controller 2075 is configured to acquire image data, which is generated by the CPU 2000 and the like on a frame buffer provided in the RAM 2020, and to cause the image data to be displayed on the display device 2080. Instead, the graphic controller 2075 may include therein the frame buffer in which the image data generated by the CPU 2000 and the like is stored.

The input/output controller 2084 is configured to connect the host controller 2082, and the communication interface 2030, the hard disk drive 2040 and the DVD drive 2060, which are relatively high-speed input/output devices. The communication interface 2030 is configured to perform communication with other devices via a network. The hard disk drive 2040 is configured to store programs and data, which are used by the CPU 2000 within the computer 1900. The DVD drive 2060 is configured to read programs or data from a DVD-ROM 2095, and to provide the same to the hard disk drive 2040 via the RAM 2020.

Also, the input/output controller 2084 is connected to the relatively low-speed input/output devices of the ROM 2010, the flexible disk drive 2050 and the input/output chip 2070. The ROM 2010 is configured to store a boot program, which is executed when the computer 1900 is activated, and/or programs and the like depending on the hardware of the computer 1900. The flexible disk drive 2050 is configured to read programs or data from a flexible disk 2090, and to provide the same to the hard disk drive 2040 via the RAM 2020. The input/output chip 2070 is configured to connect the flexible disk drive 2050 to the input/output controller 2084, and to connect a variety of input/output devices to the input/output controller 2084 via a parallel port, a serial port, a keyboard port, a mouse port and the like, for example.

The program that is provided to the hard disk drive 2040 via the RAM 2020 is provided by a user with being stored in a recording medium such as the flexible disk 2090, the DVD-ROM 2095 or an IC card. The program is read from the recording medium, is installed in the hard disk drive 2040 of the computer 1900 via the RAM 2020, and is executed by the CPU 2000. The program is installed in the computer 1900 to cause the computer 1900 to function as respective configurations of the rotation angle detection device 100.

The information processing described in the program is read into the computer 1900, resulting in functioning as at least some of the filter unit 140, the filter unit 23, the first signal processing unit 14, the second signal processing unit 16, the angle computing unit 28, the reference angle generation unit 22, the angle error calculation unit 24 and the correction value calculation unit 26, which are specific means resulting from cooperation between the software and the above-mentioned various types of hardware resources. The operation or processing of information in accordance with the using purpose of the computer 1900 of the present embodiment is realized by the specific means, so that the specific rotation angle detection device 100 in accordance with the using purpose is constituted.

As an example, when communication is performed between the computer 1900 and an external device and the like, the CPU 2000 executes a communication program loaded onto the RAM 2020 to instruct communication processing to the communication interface 2030, based on the processing described in the communication program. The communication interface 2030, under control of the CPU 2000, reads transmission data stored in a transmission buffering region provided in the storage device such as the RAM 2020, the hard disk drive 2040, the flexible disk 2090, the DVD-ROM 2095 or the like, and transmits the read transmission data to the network or writes reception data received from the network to a reception buffering region or the like provided on the storage device. In this way, the communication interface 2030 may transfer the transmission and reception data with the storage device by a direct memory access (DMA) manner. Instead, the CPU 2000 may read data from the storage device or communication interface 2030 of a transmission source, and write the data to the communication interface 2030 or storage device of a transmission destination, thereby transferring the transmission and reception data.

Also, the CPU 2000 is configured to cause all or a necessary portion of a file or a database, which has been stored in an external storage device such as the hard disk drive 2040, the DVD drive 2060 (DVD-ROM 2095), the flexible disk drive 2050 (flexible disk 2090) and the like, to be read into the RAM 2020 by the DMA transfer or the like, thereby performing various types of processing on the data on the RAM 2020. The CPU 2000 is configured to write back the processed data to the external storage device by the DMA transfer or the like. In the processing, the RAM 2020 can be regarded as temporarily holding contents of the external storage device. Therefore, in the present embodiment, the RAM 2020 and the external storage device are collectively referred to as a memory, a storage unit or a storage device. In the present embodiment, various types of information, such as various types of programs, data, tables, and databases, may be stored in the storage device to undergo information processing. In the meantime, the CPU 2000 may be configured to hold a portion of the RAM 2020 in a cache memory, and to perform reading and writing on the cache memory. Also in this aspect, since the cache memory serves as a portion of the functions of the RAM 2020, the cache memory is also included in the RAM 2020, the memory and/or the storage device in the present embodiment, unless otherwise indicated.

Also, the CPU 2000 is configured to perform various types of processing on the data read from the RAM 202, which includes various types of operations, processing of information, condition judging, search/replace of information and the like described in the present embodiment and is designated by an instruction sequence of programs, and writes the result back to the RAM 2020. For example, when performing condition judging, the CPU 2000 judges whether various types of variables described in the present embodiment satisfy a condition, which indicates that the variables are larger, smaller, equal or larger, equal or smaller, or equal, as compared to the other variables or constants, and when the condition is satisfied (or is not satisfied), the CPU is branched to a different instruction sequence or calls a subroutine.

In addition, the CPU 2000 may search for information in a file, a database, etc., in the storage device. For example, when a plurality of entries, each having an attribute value of a first attribute associated with an attribute value of a second attribute, is stored in the storage device, the CPU 2000 may search for an entry matching the condition whose attribute value of the first attribute is designated, from the plurality of entries stored in the storage device, and read the attribute value of the second attribute stored in the entry, thereby obtaining the attribute value of the second attribute associated with the first attribute satisfying the predetermined condition.

The above-described program or module may be stored in an external recording medium. As the recording medium, an optical recording medium such as a DVD, a Blu-ray (registered trademark) and a CD, an optic-magnetic recording medium such as an MO, a tape medium, a semiconductor memory such as an IC card, and the like may be used, in addition to the flexible disk 2090 and the DVD-ROM 2095. Also, a storage device such as a hard disk or a RAM provided in a server system connected to a dedicated communication network or the Internet may be used as the recording medium, thereby providing the program to the computer 1900 via the network.

Although the present invention has been described with reference to the embodiments, the technical scope of the present invention is not limited to the scope described in the embodiments. It is obvious to one skilled in the art that the embodiments can be diversely changed or improved. It is also obvious from the claims that the changes or improvements can also be included within the technical scope of the present invention.

The operations, procedures, steps, and stages of each process performed by an apparatus, system, program, and method shown in the claims, specification and drawings can be performed in any order as long as the order is not explicitly indicated by "prior to," "before," or the like and as long as the output from a previous process is not used in a later process. Even if the process flow is described using phrases such as "first" or "next" in the claims, specification and drawings, it does not necessarily mean that the process must be performed in this order.

What is claimed is:

1. A rotation angle detection device configured to detect a rotation angle of a magnetic field generation source, based on a magnetic field in at least two directions detected by a magnetic field detection device, the rotation angle detection device comprising:
    a correction value calculation unit configured to calculate a correction value of the rotation angle;
    an angle output unit configured to output an angle output signal indicative of the rotation angle of the magnetic field generation source, based on a magnetic field detection signal to be output from the magnetic field detection device and the correction value; and
    a filter unit configured to output a filtered signal obtained by filtering the magnetic field detection signal, wherein
    the filter unit selects, as the filtered signal, a first signal filtered with a first filter characteristic under a condition that the filtered signal is used for outputting the angle output signal and a second signal filtered with a second filter characteristic under a condition that the filtered signal is used for calculating the correction value, and
    a band of the first filter characteristic through which the first signal is to pass is narrower than a band of the second filter characteristic through which the second signal is to pass.

2. The rotation angle detection device according to claim 1, wherein the angle output unit comprises:
    a first computing unit configured to output a first computing signal corresponding to the magnetic field detection signal;
    an angle update unit configured to output the angle output signal, based on the first computing signal; and
    a feedback unit configured to generate a magnetic field correction signal and to output the magnetic field correction signal to the first computing unit,
    the filter unit is configured to input a signal, which is to be obtained by filtering an output from the first computing unit, to the angle update unit,
    when the rotation angle detection device calculates the correction value,
    the first computing unit is input with the magnetic field detection signal and outputs the first computing signal,
    the angle update unit is input with a signal filtered using the second filter characteristic and generates an uncorrected angle signal, and
    the correction value calculation unit calculates the correction value, based on the uncorrected angle signal, and
    when the rotation angle detection device generates the angle output signal,
    the first computing unit is input with the magnetic field detection signal and the magnetic field correction signal and outputs the first computing signal,
    the angle update unit is input with a signal filtered using the first filter characteristic and generates the angle output signal, and
    the feedback unit calculates the magnetic field correction signal by inputting the angle output signal and the correction value, and feeds the magnetic field correction signal back to the first computing unit.

3. The rotation angle detection device according to claim 2, wherein the correction value calculation unit is configured to calculate the correction value, based on the angle output signal, which is to be generated without using the correction value by the angle update unit, and a reference angle signal having passed through a filter having a preset delay characteristic.

4. The rotation angle detection device according to claim 1, wherein the angle output unit comprises an angle computing unit configured to output an angle signal, which corresponds to the magnetic field detection signal corresponding to the magnetic field detected by the magnetic field detection device and the correction value,
    the correction value calculation unit is configured to calculate the correction value, based on the angle signal output by the angle computing unit without using the correction value, and
    when calculating the correction value of the rotation angle, the filter unit inputs the second signal, which is obtained by filtering the angle signal by using the second filter characteristic, to the correction value calculation unit, and when generating the angle output signal by using the correction value, the filter unit outputs the first signal, which is obtained by filtering the angle signal by using the first filter characteristic, as the angle output signal.

5. The rotation angle detection device according to claim 1, wherein the angle output unit comprises an angle computing unit configured to output the angle output signal, based on the magnetic field detection signal corresponding to the magnetic field detected by the magnetic field detection device,
    the correction value calculation unit is configured to calculate the correction value, based on the angle output signal output by the angle computing unit without using the correction value, and
    when calculating the correction value, the filter unit inputs the second signal, which is obtained by filtering the magnetic field detection signal by using the second filter characteristic, to the angle computing unit, and when generating the angle output signal by using the correction value, the filter unit inputs the first signal, which is obtained by filtering the magnetic field detection signal by using the first filter characteristic, to the angle computing unit.

6. A rotation angle detection method of detecting a rotation angle of a magnetic field generation source, based on a magnetic field in at least two directions detected by a magnetic field detection device, the rotation angle detection method comprising:

calculating a correction value of the rotation angle, based on a second signal having passed through a filter unit under a condition that a second filter characteristic is selected in the filter unit, the filter unit capable of selecting a first filter characteristic and the second filter characteristic different from the first filter characteristic; and outputting an angle output signal indicative of the rotation angle of the magnetic field generation source, based on (i) a first signal having passed through the filter unit under a condition that the first filter characteristic is selected in the filter unit and (ii) the correction value, wherein a band of the first filter characteristic through which the first signal is to pass is narrower than a band of the second filter characteristic through which the second signal is to pass.

7. A computer-readable recording medium having a program recorded therein for causing a computer to execute the rotation angle detection method according to claim 6.

8. A rotation angle detection method of detecting a rotation angle of a rotating body, the rotation angle detection method comprising:

obtaining a magnetic field detection signal by detecting a magnetic field component in at least two directions by using a magnetic field detection device, the magnetic field component being generated by a magnetic field generation source provided to the rotating body; and outputting an angle output signal based on the magnetic field detection signal and a correction value calculated in advance and by using a first filter having a first filter characteristic, the angle output signal indicating the rotation angle;

wherein the correction value is a correction value calculated in advance based on an output signal of the magnetic field detection device and by using a second filter having a second filter characteristic different from the first filter characteristic, wherein a band of the first filter characteristic through which a signal is to pass is narrower than a band of the second filter characteristic through which a signal is to pass.

9. A computer-readable recording medium having a program recorded therein for causing a computer to execute the rotation angle detection method according to claim 8.

* * * * *